United States Patent [19]

Sato

[11] Patent Number: 5,428,719
[45] Date of Patent: Jun. 27, 1995

[54] METHOD AND APPARATUS FOR GENERATING HIGH-QUALITY PATTERN IN ACCORDANCE WITH AN EDGE DEFINING A CHARACTER PATTERN

[75] Inventor: Fumitaka Sato, Oome, Japan

[73] Assignee: Kabushiki Kaisha Toshiba, Kawasaki, Japan

[21] Appl. No.: 337,512

[22] Filed: Nov. 8, 1994

Related U.S. Application Data

[63] Continuation of Ser. No. 95,495, Jul. 26, 1993, abandoned, which is a continuation of Ser. No. 17,441, Feb. 12, 1993, abandoned, which is a continuation of Ser. No. 899,032, Jun. 16, 1993, abandoned, which is a continuation of Ser. No. 503,932, Apr. 4, 1990, abandoned.

[30] Foreign Application Priority Data

Apr. 6, 1989 [JP] Japan .................................. 1-87333

[51] Int. Cl.$^6$ ............................................. G06T 11/40
[52] U.S. Cl. ..................... 395/129; 395/120; 395/133; 395/143
[58] Field of Search ................... 395/118–120, 395/129, 131, 133–136, 140–143, 155–161; 382/54, 55

[56] References Cited

U.S. PATENT DOCUMENTS

| | | | |
|---|---|---|---|
| 4,298,945 | 11/1981 | Kyte et al. | 364/523 |
| 4,815,009 | 3/1989 | Blatin | 395/129 |
| 4,998,211 | 3/1991 | Hamada et al. | 395/131 |
| 5,053,759 | 10/1991 | Sato | 345/144 |

OTHER PUBLICATIONS

Postscript ® Language Reference Manuel, Adobe Sys., Inc. (1985) pp. 69–71.
W. M. Newman & R. F. Sproull, Principles of Interactive Computer Graphics (2d ed. 1979) pp. 20–28.

*Primary Examiner*—Almis R. Jankus
*Attorney, Agent, or Firm*—Finnegan, Henderson, Farabow, Garrett & Dunner

[57] ABSTRACT

A projection section sequentially determines lattice points one by one in response to an input projection start command while the lattice points for approximating segments constituting a line drawing in units of segments have an 8-point connecting relationship, determines a change in state of a winding number of a plot-target-lattice point on the basis of a lattice point moving direction determined by a mutual position relation between the present plot-target-lattice point and its adjacent lattice points for approximating the segment, computes a tangential vector or its components of the present plot-target-lattice point and its adjacent segments, determines the next plot-target-lattice point, projects input size-changed edge lines in a code pattern memory in units of points while the winding number (WN) codes of the corresponding points stored in the code pattern memory are updated by the WN codes determined in units of points, and generates a projection completion response when projection of the size-changed edge lines is completed.

14 Claims, 18 Drawing Sheets

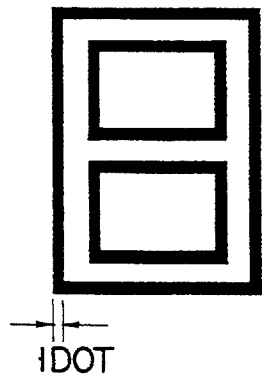
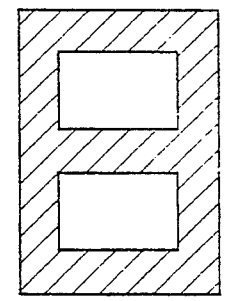
F I G. 1A
(PRIOR ART)
F I G. 1B
(PRIOR ART)
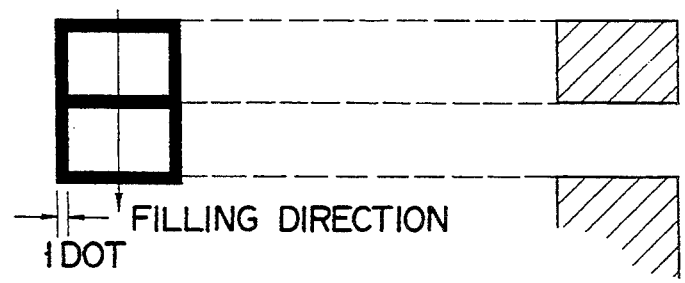
F I G. 1C
(PRIOR ART)
F I G. 1D
(PRIOR ART)
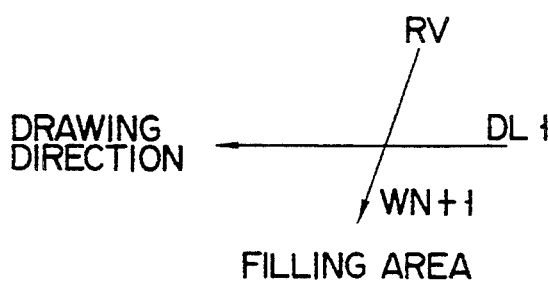
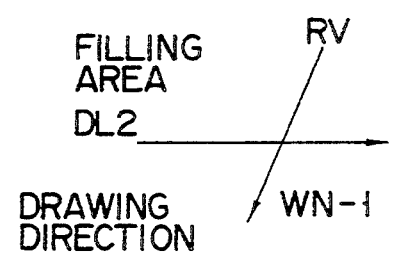
F I G. 2A
(PRIOR ART)
F I G. 2B
(PRIOR ART)

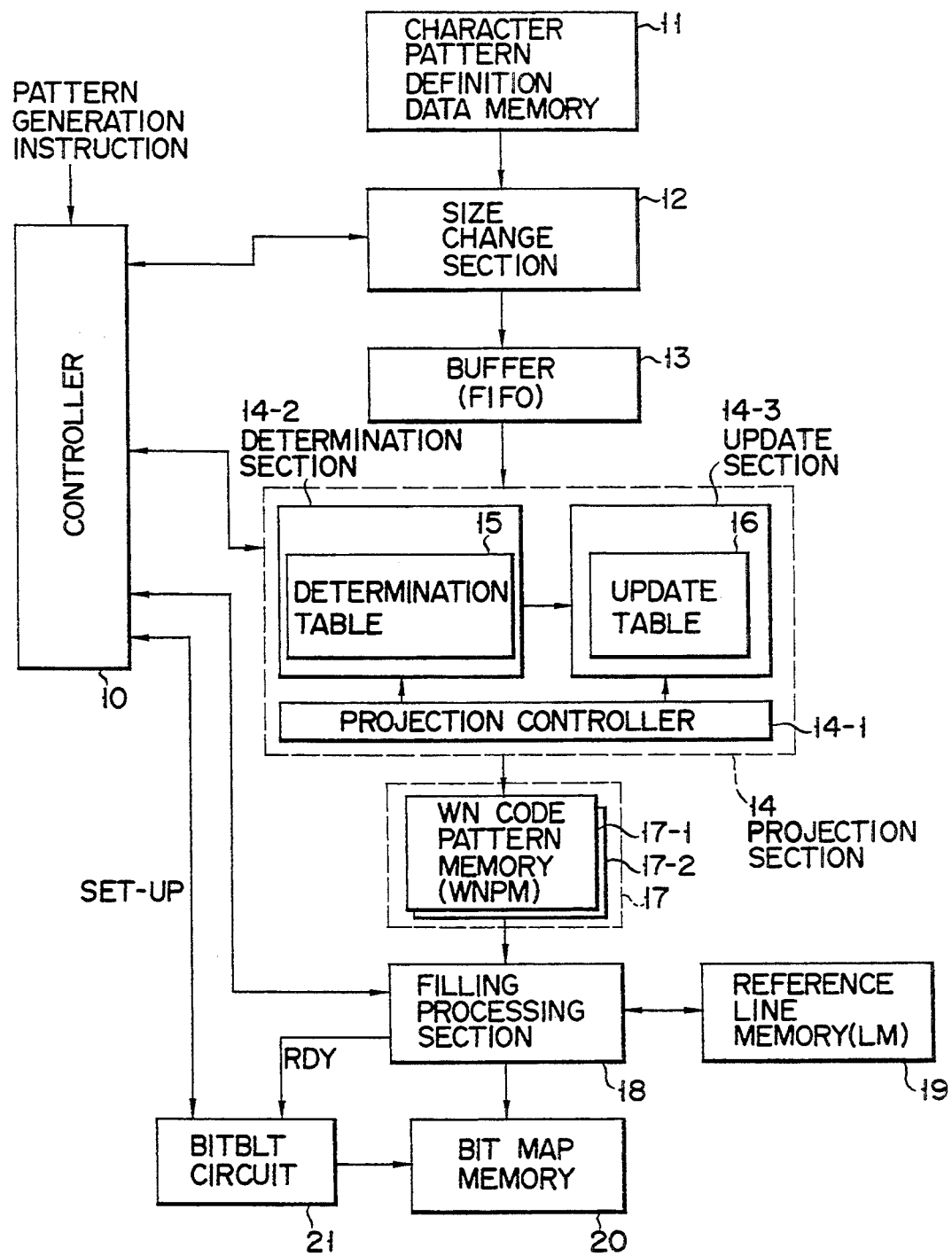
F I G. 3

|  | SEGMENT INCOMING DIRECTION | | | | | | | |
|---|---|---|---|---|---|---|---|---|
| SEGMENT OUTGOING DIRECTION | → | ↗ | ↑ | ↖ | ← | ↙ | ↓ | ↘ |
| → | − | − | ○ | ○ | ± | ± | − | − |
| ↗ | − | − | ○ | ○ | ○ | ± | − | − |
| ↑ | − | − | ○ | ○ | ○ | ○ | − | − |
| ↖ | ± | ± | + | + | + | + | ○ | ± |
| ← | ± | ± | + | + | + | + | ○ | ○ |
| ↙ | ○ | ± | + | + | + | + | ○ | ○ |
| ↓ | ○ | ○ | + | + | + | + | ○ | ○ |
| ↘ | − | − | ○ | ± | ± | ± | − | − |

F I G. 5

|  |  | WN CODE FROM WNPM | | | | | | | |
|---|---|---|---|---|---|---|---|---|---|
|  |  | −3 | −2 | −1 | 0 | 1 | 2 | 3 | ± |
| GENERATED WN CODE | 0 | −3 | −2 | −1 | 0 | 1 | 2 | 3 | ± |
|  | + | −2 | −1 | ± | 1 | 2 | 3 | * | 1 |
|  | − | * | −3 | −2 | −1 | ± | 1 | 2 | −1 |
|  | ± | −3 | −2 | −1 | ± | 1 | 2 | 3 | ± |

F I G. 6

| TANGENTIAL VECTOR DIRECTION | INCREMENT/DECREMENT | $Q_{i+1}$ POSITION DETERMINATION CONDITION | COORDINATE VALUE OF $Q_{i+1}$ IN TRACE-SUBORDINATE-AXIS DIRECTION | |
|---|---|---|---|---|
| | | | CONDITION IS SATISFIED | CONDITION IS UNSATISFIED |
| A0 | $x_{i+1} = x_i + 1$ | $y_{i+1} > y_{qi} + 1/2$ | $y_{q(i+1)} = y_{qi} + 1$ | $y_{q(i+1)} = y_{qi}$ |
| A1 | $y_{i+1} = y_i + 1$ | $x_{i+1} > x_{qi} + 1/2$ | $x_{q(i+1)} = x_{qi} + 1$ | $x_{q(i+1)} = x_{qi}$ |
| A2 | $y_{i+1} = y_i + 1$ | $x_{i+1} < x_{qi} - 1/2$ | $x_{q(i+1)} = x_{qi} - 1$ | $x_{q(i+1)} = x_{qi}$ |
| A3 | $x_{i+1} = x_i - 1$ | $y_{i+1} > y_{qi} + 1/2$ | $y_{q(i+1)} = y_{qi} + 1$ | $y_{q(i+1)} = y_{qi}$ |
| A4 | $x_{i+1} = x_i - 1$ | $y_{i+1} < y_{qi} - 1/2$ | $y_{q(i+1)} = y_{qi} - 1$ | $y_{q(i+1)} = y_{qi}$ |
| A5 | $y_{i+1} = y_i - 1$ | $x_{i+1} < x_{qi} - 1/2$ | $x_{q(i+1)} = x_{qi} - 1$ | $x_{q(i+1)} = x_{qi}$ |
| A6 | $y_{i+1} = y_i - 1$ | $x_{i+1} > x_{qi} + 1/2$ | $x_{q(i+1)} = x_{qi} + 1$ | $x_{q(i+1)} = x_{qi}$ |
| A7 | $x_{i+1} = x_i + 1$ | $y_{i+1} < y_{qi} - 1/2$ | $y_{q(i+1)} = y_{qi} - 1$ | $y_{q(i+1)} = y_{qi}$ |

FIG. 10

| TANGENTIAL VECTOR DIRECTION | TANGENTIAL DIRECTION DETERMINATION CONDITION | INCREMENTAL /DECREMENTAL OPERATION | $Q_{i+1}$ POSITION DETERMINATION CONDITION |
|---|---|---|---|
| A0 | $0 < g'(\bar{t}_i) < f'(\bar{t}_i)$ | $\Delta t = \dfrac{1-(x\bar{t}_i - x_{qi})}{f'(\bar{t}_i)}$ ; $\bar{t}_{i+1} = \bar{t}_i + \Delta t$ ; $x_{q(i+1)} = x_{qi}+1$ | $g'(\bar{t}_i)\Delta t > y_{qi} + 1/2 - y\bar{t}_i$ |
| A1 | $0 < f'(\bar{t}_i) < g'(\bar{t}_i)$ | $\Delta t = \dfrac{1-(y\bar{t}_i - y_{qi})}{g'(\bar{t}_i)}$ ; $\bar{t}_{i+1} = \bar{t}_i + \Delta t$ ; $y_{q(i+1)} = y_{qi}+1$ | $f'(\bar{t}_i)\Delta t > x_{qi} + 1/2 - x\bar{t}_i$ |
| A2 | $0 < -f'(\bar{t}_i) < g'(\bar{t}_i)$ | $\Delta t = \dfrac{1-(y\bar{t}_i - y_{qi})}{g'(\bar{t}_i)}$ ; $\bar{t}_{i+1} = \bar{t}_i + \Delta t$ ; $y_{q(i+1)} = y_{qi}+1$ | $f'(\bar{t}_i)\Delta t < x_{qi} - 1/2 - x\bar{t}_i$ |
| A3 | $0 < -g'(\bar{t}_i) < -f'(\bar{t}_i)$ | $\Delta t = \dfrac{-1+(x\bar{t}_i - x_{qi})}{f'(\bar{t}_i)}$ ; $\bar{t}_{i+1} = \bar{t}_i + \Delta t$ ; $x_{q(i+1)} = x_{qi}-1$ | $g'(\bar{t}_i)\Delta t > y_{qi} + 1/2 - y\bar{t}_i$ |
| A4 | $0 < -g'(\bar{t}_i) < -f'(\bar{t}_i)$ | $\Delta t = \dfrac{-1+(y\bar{t}_i - y_{qi})}{g'(\bar{t}_i)}$ ; $\bar{t}_{i+1} = \bar{t}_i + \Delta t$ ; $x_{q(i+1)} = x_{qi}-1$ | $g'(\bar{t}_i)\Delta t < y_{qi} - 1/2 - y\bar{t}_i$ |
| A5 | $0 < -f'(\bar{t}_i) < -g'(\bar{t}_i)$ | $\Delta t = \dfrac{-1+(y\bar{t}_i - y_{qi})}{g'(\bar{t}_i)}$ ; $\bar{t}_{i+1} = \bar{t}_i + \Delta t$ ; $y_{q(i+1)} = y_{qi}-1$ | $f'(\bar{t}_i)\Delta t < x_{qi} - 1/2 - x\bar{t}_i$ |
| A6 | $0 < f'(\bar{t}_i) < -g'(\bar{t}_i)$ | $\Delta t = \dfrac{-1+(y\bar{t}_i - y_{qi})}{g'(\bar{t}_i)}$ ; $\bar{t}_{i+1} = \bar{t}_i + \Delta t$ ; $y_{q(i+1)} = y_{qi}-1$ | $f'(\bar{t}_i)\Delta t > x_{qi} + 1/2 - x\bar{t}_i$ |
| A7 | $0 < -g'(\bar{t}_i) < f'(\bar{t}_i)$ | $\Delta t = \dfrac{1-(x\bar{t}_i - x_{qi})}{f'(\bar{t}_i)}$ ; $\bar{t}_{i+1} = \bar{t}_i + \Delta t$ ; $x_{q(i+1)} = x_{qi}+1$ | $f'(\bar{t}_i)\Delta t < y_{qi} - 1/2 - x\bar{t}_i$ |

FIG. 14

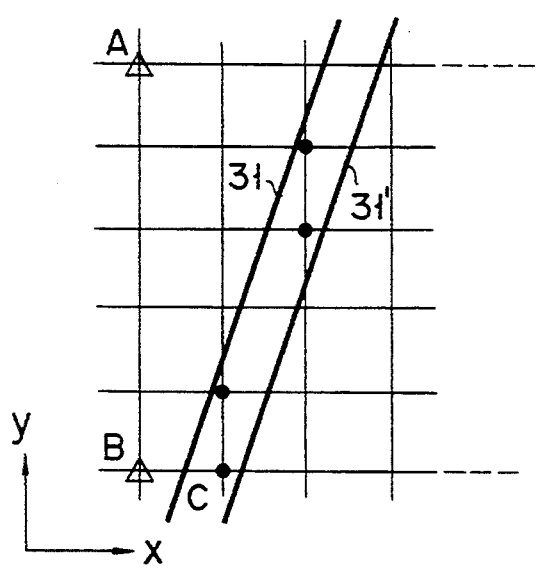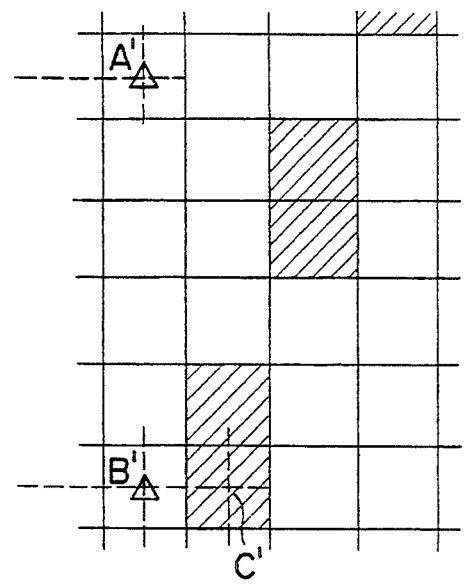
FIG. 17A          FIG. 17B
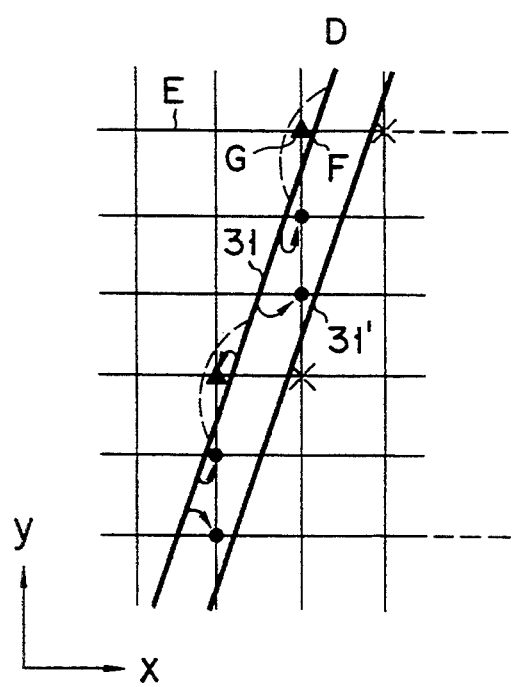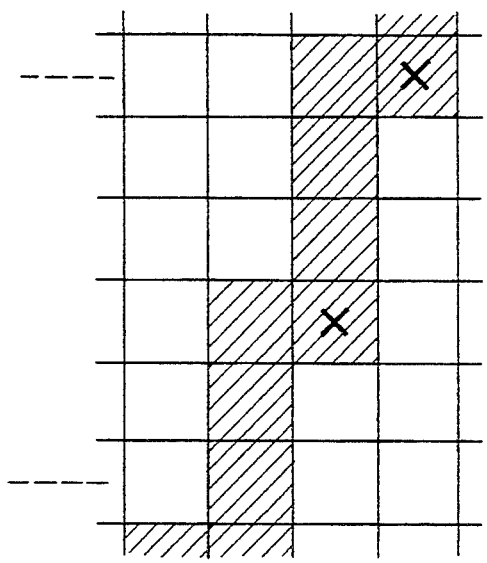
FIG. 18A          FIG. 18B

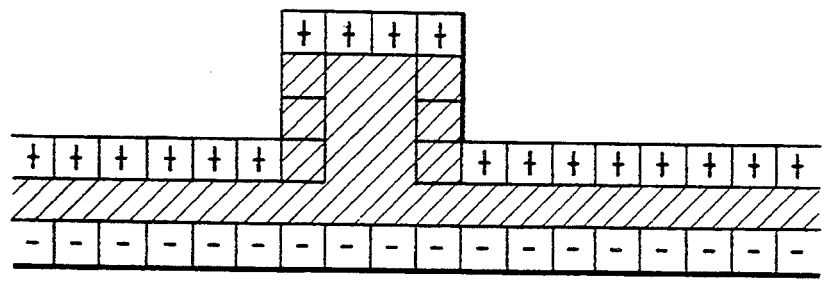
FIG. 21

FIG. 22B
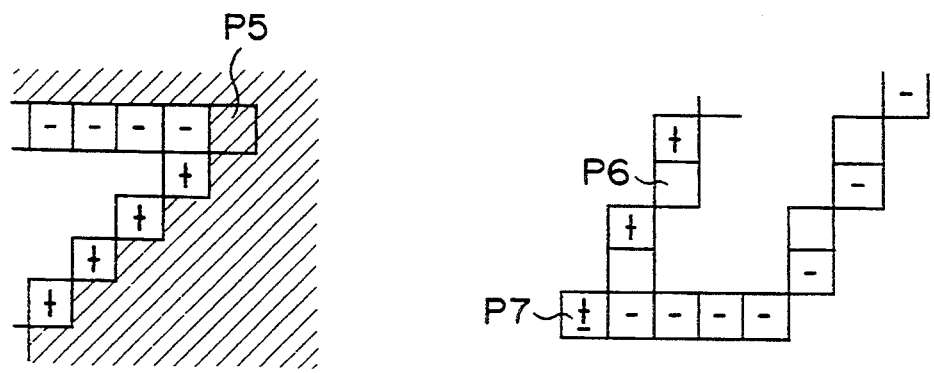
FIG. 23    FIG. 24

METHOD AND APPARATUS FOR GENERATING HIGH-QUALITY PATTERN IN ACCORDANCE WITH AN EDGE DEFINING A CHARACTER PATTERN

This application is a continuation of application Ser. No. 08/095,495 filed Jul. 26, 1993, now abandoned, which is a continuation of application Ser. No. 08/017,441 filed Feb. 12, 1993, now abandoned, which is a continuation application of Ser. No. 07/899,032 filed Jun. 16, 1992, now abandoned, which is a continuation of application Ser. No. 07,/503,932 filed Apr. 4, 1990, now abandoned.

BACKGROUND OF THE INVENTION

1. Field of the Invention

The present invention relates to a method and apparatus for generating a high-quality pattern in accordance with an edge for defining a pattern such as a character pattern.

2. Description of the Related Art

In general, an edge is drawn and then the inside of an area surrounded by an edge line or edge lines is filled to generate a pattern. The following first to third methods are available to perform filling of an area defined by the edge line or lines.

According to the first method, a point designated within a defined area is continuously shifted to determine whether the shifted point is located inside or outside the defined area. When a given point is determined to be present inside the area, this point is subjected to filling processing. This method is used in graphic processing in a personal computer or the like. The determination operation is performed in units of points, and its processing speed is low. In addition, this method is based on "continuity of the area", back tracking must be generally performed at a branch point during filling.

According to the second method, a bit map memory which stores edge line data is scanned in a predetermined direction (filling direction) to perform filling of points as "1" from, e.g., an odd-numbered "1" point to an even-numbered "1" point (i.e., even-odd filling). The second method does not require back tracking. In the even-odd filling scheme, the number of crossings between a scanning line and an edge line is counted. When a count represents an odd number, the corresponding point is determined to be present inside the edge line. Otherwise, the point is determined to be present outside the edge line. According to the second method, however, when the number of dots of, e.g., a sharp end of a character pattern in the filling direction is one (this sharp end is defined as a one-dot sharp end), a subsequent dot string from the sharp-end dot is also filled, resulting in inconvenience. In order to overcome this drawback, character pattern design must be performed not to generate a one-dot sharp end (a sharp dot having only one dot in a direction perpendicular to the filling direction is not called a one-dot sharp end), resulting in cumbersome, time-consuming operations. In order to generate a one-dot sharp end, an edge line of a character pattern having a one-dot sharp end must be overwritten after a character pattern having no one-dot sharp end is generated by filling processing.

According to the second method, when edge lines of a character pattern do not overlap each other, as shown in FIG. 1A, a correct character pattern shown in FIG. 1B can be obtained. However, when edge lines of a character pattern overlap on the same lattice line and form a one-dot line width due to pattern reduction or the like, as shown in FIG. 1C, a wrong character pattern shown in FIG. 1D is undesirably generated. The filling direction in FIGS. 1B and 1D is a y direction (i.e., downward direction in FIGS. 1B and 1D).

The third method is a filling method in accordance with a non-zero winding number scheme used in the Post Script as a page descriptive language developed by Adobe Systems Inc. As shown in FIG. 2A, when a drawing direction of an edge line is directed to the left with respect to a vector from the infinity, i.e., a vector RV representing a filling direction, a winding number WN is incremented by one. However, when the drawing direction of an edge line is directed toward the right, as shown in FIG. 2B, the winding number is decremented by one. If the resultant winding number is zero, the corresponding crossing is determined to be present outside the edge line. Otherwise, it is determined to be present inside the edge line. According to the third method, segments constituting an edge line of a character must be sorted and listed in accordance with a given standard such as y-coordinates. When a "FILL" command is to be executed, a program loop is generated to scan scanning lines, e.g., lines parallel to the x-axis, downward. All intersections between the scanning lines parallel to the x-axis and the segments in the list must be obtained every loop. The descriptive contents of the segments are checked in an order of x-coordinates of the intersections to determine the drawing directions (upward or downward direction) of the lines, and the winding numbers (to be referred to as WNs hereinafter) are obtained. A line for a non-zero interval of the WNs is drawn in the bit map memory. The above operations are repeated in the program loop according to the third method.

10 As described above, according to the third method, the list of segments constituting the edge must be checked every line. For this reason, a long processing time is required for a complicated pattern such as a kanji (Chinese character) pattern whose segment list is relatively long. The computation of the above intersections must also be repeated by the "total number of dots of the edge line". As described above, in filling processing based on the conventional even-odd scheme, a line having a one-dot width and a character pattern having a one-dot sharp end cannot be accurately generated. High-speed processing cannot be performed in filling processing based on the non-zero winding number scheme. In either scheme, filling processing is performed in units of dots, and the processing speed is inevitably low.

SUMMARY OF THE INVENTION

It is an object of the present invention to provide a method and apparatus capable of correctly generating a line having a one-dot width and a pattern having a one-dot sharp end, and generating a complicated pattern at high speed.

According to an aspect of the present invention, there is provided an apparatus for generating a high-quality pattern defined by edge lines, comprising: code generating means for sequentially determining lattice eight points one by one for line drawing information for defining a pattern by at least one line drawing, while the lattice points for approximating segments constituting a line drawing in units of segments have an 8-point connecting relationship, determining a change in state of a winding number at a present plot target lattice point from a moving direction of a lattice point determined by a mutual position relation between the present plot target lattice point and the lattice point for approximating the segments preceding and succeeding the present plot target lattice point, and tracing the line drawing in an order of the line drawing represented by the line drawing information by generating one of a first value representing no change, a second value representing one increment, a third value representing one decrement, and a fourth value representing simultaneous occurrence of one increment and one decrement as a winding number change count or one winding number code representing the change in state; winding number code storage means for storing the winding number change count or a second winding number code representing a change in state of each point of all line drawings which define the pattern; updating means for updating the second winding number code of a given lattice point in said winding number code storage means on the basis of the first winding number code generated by said code generating means, the given lattice point corresponding to the first winding number code; and filling means for sequentially extracting the second winding number codes of the respective lattice points stored in said winding number code storage means in a filling direction, and generating winding numbers on the basis of the extracted winding numbers.

According to another aspect of the present invention, there is provided a method of generating a high-quality pattern defined by edge lines, comprising the computer steps of: computing WN codes representing differences in winding number (WN) data between each dot projected with an edge line, the dot being a present plot target lattice point, and points adjacent to the present plot target lattice point in a filling direction and a direction opposite to the filling direction, obtaining a tangential vector or tangential vector components of the present plot target lattice point or the segments adjacent thereto, and determining a next plot target lattice point; and obtaining filling data of a target point from the present plot target lattice point with reference to the WN data of the adjacent point in the direction opposite to the filling direction, and filling the present plot target lattice point in accordance with the WN data of the target point.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 1A through 1D are views for explaining patterns generated by conventional methods, respectively;

FIGS. 2A and 2B are views for explaining winding number (WN) data;

FIG. 3 is a block diagram showing a high-quality pattern generating apparatus according to an embodiment of the present invention;

FIG. 5 is a view showing contents of a WN code determination table 15 shown in FIG. 3;

FIG. 6 is a view showing contents of a WN code update table 16 shown in FIG. 3;

FIG. 10 is a view showing a correspondence between the directions of the tangential vectors and plot point determination conditions for the segments which do not require the parameter expressions;

FIG. 14 is a view showing a correspondence between the directions of the tangential vectors and the plot point determination conditions when the segments which require parameter expressions are processed;

FIGS. 17A and 17B are views for explaining a problem when a pattern having a thin line is reduced;

FIGS. 18A and 18B are views for explaining a DDA plot scheme for solving the problem posed by FIGS. 17A and 17B in correspondence with FIGS. 17A and 17B;

FIG. 21 is a view showing a relationship between a character pattern and a WN code;

FIGS. 22A and 22B are views showing states in changes in WN code when a character pattern shown in FIG. 21 is reduced into ½;

FIG. 23 is a view showing a pattern from which WN code updating can be omitted; and FIG. 24 is a view showing a relationship between a WN code and a pattern having a one-dot sharp end.

DETAILED DESCRIPTION OF THE PREFERRED EMBODIMENTS

Figure 4:
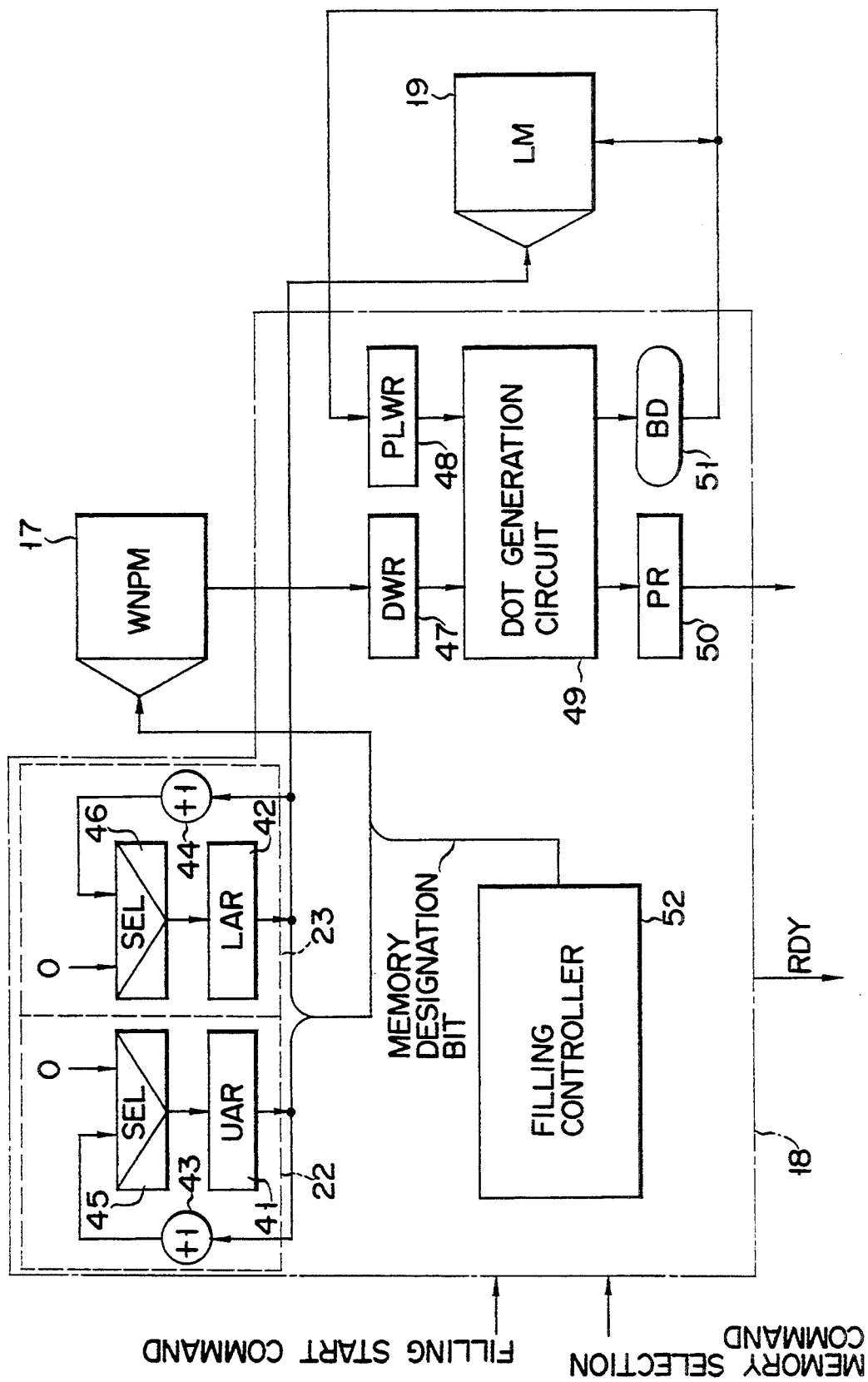
FIG. 4 is a block diagram showing a peripheral arrangement of a filling processing section 18 shown in FIG. 3.

FIG. 3 is a block diagram showing a high-quality character pattern generating apparatus according to an embodiment of the present invention. Referring to FIG.

3, a character pattern definition data memory 11 stores pattern definition data for defining character patterns having a standard size. Each character pattern consists of at least one pattern, and each pattern consists of at least one partial pattern. Each pattern is defined by an edge line. An edge line consists of a straight line and/or a curve. In this embodiment, an edge defined by an edge line or edge lines is closed. The drawing direction of the edge line is defined as a direction along which a filling area is located on the left side, and the filling direction is defined as the y-axis. In this embodiment, the filling direction is defined as a downward direction, but this definition is not essential to the present invention. For example, the drawing direction may be defined as a direction along which a filling area is located on the right side, and the filling direction may be defined as the x-axis.

The pattern definition data includes data representing the number of patterns constituting a character and the number of partial patterns constituting each pattern, i.e., edge line count data N representing the number of edge lines, and edge line data representing each group of edge lines defining each partial pattern.

A size change section 12 reads out pattern definition data from the memory 11 in accordance with an input size change command and enlarges/reduces pattern definition data read out to obtain a designated size represented by the size change command. The enlarged/reduced pattern definition data is output to a first-in first-out (FIFO) buffer 13. The FIFO buffer 13 temporarily stores the pattern definition data from the size change section 12.

A projection section 14 projects an edge line determined by edge line data of the pattern definition data from the FIFO 13 onto a WN code pattern memory (WNPM) 17 in units of edge points in response to a projection start command from a controller 10. An edge point is defined as an intersection between an edge line and a lattice line of coordinates projected with this edge line, or a lattice point approximate to this intersection. Each edge point has a winding number (WN) code when projection processing of one pattern is completed, a projection end response is output to the controller 10. The projection section 14 comprises a projection controller 14-1, a determination section 14-2, and an update section 14-3. The controller 14-1 controls the operations of the determination section 14-2 and the update section 14-3 in accordance with a command from the controller 14-1. The update section 14-3 updates a WN code of a target point which is stored in the WNPM 17 in accordance with an WN code determined by the determination section 14-2.

The determination section 14-2 includes a determination table 15 (FIG. 5) for determining WN codes. The determination table 15 outputs a WN code for a target point on the basis of an edge line segment incoming direction to the target point and an edge line segment outgoing direction from the target point. The determination section 14 determines a WN code 15 for the target point with reference to the determination table 15 on the basis of the edge line data from the FIFO buffer 13 in response to a determination command from the controller 14-1. The WN code is a code representing a difference between the winding number WN of the target point and data WN representing a point opposite to the filling direction with respect to the target point, e.g., an upper point adjacent to the target point in this embodiment.

The WN code and the determination table 15 will be described in detail below.

Eight WN codes are available in this embodiment. The first WN code is code "0" representing that the target point data WN is equal to data of the upper point adjacent to the target point. The second, third, and fourth WN codes are codes "+1", "+2", and "+3" representing that the target point data WN have values larger than the adjacent point data WN by 1, 2, and 3, respectively. The fifth, sixth, and seventh WN codes are codes "−1", "−2" and "−3" representing that the target point data WN have values smaller than the adjacent point data WN by 1, 2, and 3, respectively. The eighth WN code is a code "±" representing that data WN of the upper adjacent point is equal to that of the upper or lower adjacent point in the filling direction but the target data WN represents a value different from each of the data WN of the upper or lower adjacent point data by 1. In character pattern generation processing of this embodiment, a maximum of three edges can overlap each other, so that the eight WN codes, i.e., "−3" to "+3+" and "±", must be prepared. Therefore, each WN code is expressed by three bits. When one edge becomes a target edge in the determination table 15, only four WN codes (i.e., "−1" to "+1" and "±") are used in each determination cycle. FIG. 5 shows contents of the WN code determination table 15. Referring to FIG. 5, a black dot "." represents a target point, a direction of arrow "→" toward the black dot represents a segment direction of an edge line from the target point to the present target point, i.e., the segment incoming direction, and a direction of arrow "→" away from the black dot represents a direction from the present target point to the next target point, i.e., the segment outgoing direction. The segment directions are quantized in units of 45° and classified into eight direction codes. The projection section 14 determines a WN code with reference to the determination table 15 (FIG. 5) in accordance with the two direction codes, i.e., the segment incoming direction code and the segment outgoing direction code. The reference for measuring an angle is given such that the angle changes counterclockwise from a perpendicular and downward direction.

1) If a segment incoming direction code represents a 90° direction and a segment outgoing direction code represents an angle falling within the range of $0° < \theta \leq 180°$, a code "−" (−1) is determined as a WN code. This corresponds to upper three "−" symbols in the leftmost column and downmost "−" symbol of the same column in a 8×8 matrix of FIG. 5. If the segment incoming direction code represents the 90° direction and the segment outgoing direction code represents an angle falling within the range of $225° \leq \theta \leq 270°$, "±" is determined as a WN code. If the segment incoming direction code represents the 90° direction and the segment outgoing direction code represents an angle falling within the range of $315° < \theta \leq 360°$, "0" is determined as a WN code.

2) If a segment incoming direction code represents a 135° direction and a segment outgoing direction code represents an angle $\theta$ falling within the range of $0° \leq \theta \leq 180°$, "−" (−1) is determined as a WN code. If the segment incoming direction code represents the 135° direction and the segment outgoing direction code represents an angle $\theta$ falling within the range of $225° \leq \theta 315°$, "±" is determined as a WN code. If the segment incoming direction code represents the 135° direction and the segment outgoing direction code represents an angle $\theta=360°$, "0" is determined as a WN code.

3) If a segment incoming direction code represents a 180° direction and a segment outgoing direction code represents an angle $\theta$ falling within the range of $0° \leq \theta \leq 180°$, "0" is determined as a WN code. If the segment incoming direction code represents the 180° direction and the segment outgoing direction code represents an angle $\theta$ falling within the range of $225° \leq \theta \leq 360°$, "+" is determined as a WN code.

4) If a segment incoming direction code represents a 225° direction and a segment outgoing direction code represents an angle $\theta=45°$, "±" is determined as a WN code. If the segment incoming direction code represents the 225° direction and the segment outgoing direction code represents an angle $\theta$ falling within the range of $90° \leq \theta \leq 180°$, "0" is determined as a WN code. If the segment incoming direction code represents the 225° direction and the segment outgoing direction code represents an angle $\theta$ falling within the range of $225° \leq \theta \leq 360°$, "+" is determined as a WN code.

5) If a segment incoming direction code represents a 270° direction and a segment outgoing direction code represents an angle $\theta$ falling within the range of $45° \leq \theta \leq 90°$, a code "±" is determined as a WN code. If the segment incoming direction code represents the 270° direction and the segment outgoing direction code represents the angle $\theta$ falling within the range of $135° \leq \theta \leq 180°$, "0" is determined as a WN code. If the segment incoming direction code represents the 270° direction and the segment outgoing direction code represents the angle $\theta$ falling within the range of $225° \leq \theta \leq 360°$, "+" is determined as a WN code.

6) If a segment incoming direction code represents a 315° direction and a segment outgoing direction code represents an angle $\theta$ falling within the range of $45° \leq \theta \leq 135°$, a code "±" is determined as a WN code. If the segment incoming direction code represents the 315° direction and the segment outgoing direction code represents the angle $\theta=180°$, "0" is determined as a WN code. If the segment incoming direction code represents the 315° direction and the segment outgoing direction code represents the angle $\theta$ falling within the range of $225° \leq \theta \leq 360°$, "+" is determined as a WN code.

7) If a segment incoming direction code represents a 0° direction and a segment outgoing direction code represents an angle 8 falling within the range of $0° \leq \theta \leq 180°$, a code "−" is determined as a WN code. If the segment incoming direction code represents the 0° direction and the segment outgoing direction code represents the angle $\theta$ falling within the range of $225° \leq \theta \leq 360°$, "0" is determined as a WN code.

8) If a segment incoming direction code represents a 45° direction and a segment outgoing direction 60 code represents an angle $\theta$ falling within the range of $45° \leq \theta \leq 180°$ a code "−" is determined as a WN code. If the segment incoming direction code represents the 45° direction and the segment outgoing direction code represents the angle $\theta=225°$, "±" is determined as a WN code. If the segment incoming direction code represents the 45° direction and the segment outgoing code represents the angle $\theta=225°$, "±" is determined as a WN code. If the segment incoming direction code represents the 45° direction and the segment outgoing direction code represents the angle falling within the range of $270° \theta \leq \theta \leq 360°$, "0" is determined as a WN code.

Figure 19:
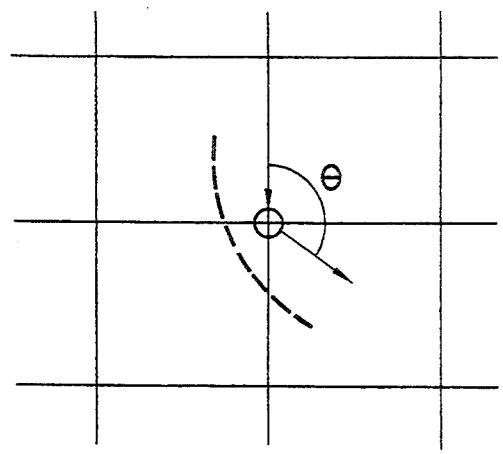
FIG. 19 is a view for explaining an application of a generation rule of a WN code.

As is apparent from the above description, as show in FIG. 19, when the segment incoming direction code represents a 0° direction and the angle $\theta$ represented by the segment outgoing direction code falls within the range of $0 < \theta \leq 180°$, a lattice point immediately below the target point represented by a hollow circle (o) falls outside the black area of the edge. The target point itself is included in the black area. Therefore, the code "−" is assigned to the target point in accordance with the definition of the WN codes.

When the angle 8.represented by the segment outgoing direction code falls within the range of $180° < \theta \leq 360°$, the lattice point immediately below the target point falls within the black area, and the lattice point immediately above the target point also falls within the black area, no changes in data WN occur before and after the target point, and the data "0" is generated. It is readily understood that codes in other directions can be easily obtained in consideration of changes in data WN of the target points and the lattice points before and after the target points.

The update section 14-3 includes an update table (FIG. 6). The update section 14-3 outputs an updated WN code with reference to the update table 16 on the basis of the WN code of the target point determined by the determination section 14-2 and the WN code of the target point which is stored in the WNPM 17 in response to an update command from the controller 14-1. The obtained WN code is written at a position corresponding to the target point in the WNPM 17. The WN codes stored in the WNPM 17 can be updated.

FIG. 6 shows contents of the update table 16. The logic of the update table 16 is determined by (updated WN code)=(WN code from WNPM 17)+(determined WN code). The arithmetic rule in this calculation formula is given as follows. If the determined WN code represents a code "+" or "−", the WN code from the WNPM 17 is incremented or decremented by one to obtain an updated WN code. When the updating result represents zero, the code is updated to "±". If the determined code represents a code "±", the WN code from the WNPM 17 is defined as "0" unless it is originally zero. In this case, the WN code from the WNPM 17 is not updated. However, when the WN code from the WNPM 17 represents "0", an operation "0"+"±"→"±" is performed. When the determined WN code is "0", the WN code from the WNPM 17 need not be updated. In this embodiment, when the determined WN code is "0", this is signaled to the controller 14-1. At this time, the controller 14-1 does not output an update command to the update section 14-3 so as to achieve high-speed processing. Therefore, the update section 14-3 is kept disabled, the update data 16 is not referred to, or the WNPM 17 is not accessed. For the sake of descriptive convenience, the WN code updated for the generated WN code="0" is shown in FIG. 6. However, this WN code need not be generated in practice. In the update table shown in FIG. 6, a maximum of three edges can overlap each other so that each entry represented by symbol "*" does not exist in this embodiment.

The winding number code pattern memory (WNPM) 17 has memories 17-1 and 17-2 each having a capacity of 24 bits/word. The memories 17-1 and 17-2 have capacities enough to store character patterns having a maximum size at a maximum resolution. The initial values of the memories 17-1 and 17-2 are "0" each. The updated WN code is stored in any one of the memories 17-1 and 17-2 of the winding number code pattern memory (WNPM) 17 which is set in the update mode. The projection section 14 selects one of the memories 17-1 and 17-2 in accordance with a selection command from the controller 10. The other memory is set by the filling section 18 in the filling mode. Therefore, while the WN code is updated in one of the memories 17-1 and 17-2, the stored WN code can be read out from the other memory. WN code updating and its filling can be pipelined in units of patterns.

Referring to FIG. 3, the filling processing section 18 performs filling processing in accordance with WN codes of the respective points stored in, e.g., the memory 17-2 of the WNPM 17 to generate a pattern while the projection section 14 writes the WN codes in, e.g., the memory 17-1. The filling processing section 18 sequentially reads out the WN codes of the respective edge points stored in one memory 17-2 of the WNPM 17 in units of eight connected points in the scanning line direction, i.e., in units of words in response to a filling command from the controller 10. The data WN of the eight points are generated in accordance with the read-out WN codes of the eight points and the reference line winding number data RLWN corresponding to the eight points. Filling processing is performed in accordance with the generated data WN in units of eight points. This processing is performed by switching the scanning lines.

A detailed arrangement of the filling processing section 18 and its peripheral section will be described in detailed with reference to FIG. 4. A line memory LM 19 having a capacity of 16 bits/word stores one-line reference line data. One-point reference data is 2-bit data, and one word represents reference line data of eight points. A bit map memory (page memory) 20 stores character patterns generated by the filling processing performed by the filling processing section 18. A bit block transfer circuit (BITBLT circuit) 21 transfers filling bit byte data to a designated area in the bit map memory 20 at high speed in accordance with set-up data from the controller 10 in response to the transfer ready signal RDY from the filling processing section 18.

An upper address register (UAR) 41 designates an upper address (y-direction address in this embodiment) of the memory 17-1 or 17-2. A lower address register (LAR) 42 designates a lower address (an x-direction address representing a word column position in the scanning line direction in this embodiment) of the memory 7-1 or 17-2. The content of the LAR 42 is also used to designate an address of the LM 19. +1 circuits 43 and 44 are used to increment the contents of the UAR 41 and LAR 42 by one each. The UAR 41, the +1 circuit 43, and a selector 45 constitute a row address generator 22. The LAR 42, the +1 circuit 44, and a selector 46 constitute a column address generator 23. A differential winding-number register (DWR) 47 stores a 24-bit WN code of the eight points, i.e,. word data read out from the WNPM 17 addressed by the UAR 41 and the LAR 42. A previous line winding-number register (PLWR) 48 stores 16-bit reference line WN data of the eight points, i.e., word data read out from the LM 19 addressed by the PLWR 48 and the LAR 42. A dot generation circuit 49 generates 8-point WN data in accordance with the 8-point reference line WN data stored in the PLWR 48. A pattern register (PR) 50 stores 8-point filling byte data output from the filling circuit 49 and supplies it to the bit map memory 20. A bus driver (BD) 51 holds 8-point data WN output from the dot generation circuit 49 and sends it as new reference line data to the LM 19. The filling controller 52 selects one of the memories 17-1 and 17-2 in accordance with a memory selection command from the controller 10 as an access objective and controls filling processing in response to a filling start command. The filling controller 25 outputs the signal RDY to the BITBLT circuit 21 when 8-dot filling byte data is generated.

Operations for generating a high-quality pattern, i.e., generation and updating of the WN codes by the projection section 14 will be mainly described with reference to FIGS. 7A to 14.

The size change section 12 in FIG. 3 reads out line drawing information which defines a character pattern of a desired character having a standard size from the character pattern memory and updates such that the read-out line drawing information can define the character pattern of the desired character size. The size change section 12 writes the updated line drawing information (the readout line drawing information if no change is made) in the FIFO buffer 13. These operations are also performed in a conventional system.

The projection section 14 sequentially selects some segments (straight line segments or curve segments) constituting each line drawing (closed curve) corresponding to each of the line segments (closed curves) defined by the line drawing information written in the FIFO buffer 13. The projection section 14 then performs processing shown in flow charts in FIGS. 7A and 7B.

Assume that the projection section 14 reads out a curve segment (FIG. 8) from the. FIFO buffer 13. In this case, the projection section 14 designates start and end points of a target segment by $P_0$ and $P_e$ and closest points to $P_0$ and $P_e$ by plot (trace) points $Q_0$ and $Q_e$ in step S1.

A lattice point for approximating the intersection corresponds to a dot constituting a character pattern to be generated. When a character pattern including a thin line is reduced to a very small size, a partial character pattern representing this thin line passes through the adjacent lattice points, and the partial pattern is cut when only data WN of the projected lattice points are used. In the worst case, when a thin line is parallel to the lattice line, the thin line may perfectly disappear. FIG. 17A shows black diagonal lines 31 and 31' as parts of the character pattern having a line width equal to a reduced lattice point interval and a lattice corresponding to dots to be generated. Referring to FIG. 17A symbol "●" represents a lattice point (i.e., a lattice point between the lines 31 and 31') of data WN of "1" in an area (black area) between the lines 31 and 31'. Four black dots are shown in FIG. 17A. FIG. 17B shows a dot arrangement of a character pattern to be output, and the center of each dot corresponds to the lattice point in FIG. 17A. For example, lattice points A, B, and C in FIG. 17A respectively correspond to centers A', B', and C' in FIG. 17B. As is apparent from FIGS. 17A and 17B, when a dot corresponding to the W number of "1" (represented by the symbol "●") is colored in black and the black dot is output, a line is interrupted, as shown in FIG. 17B. In the case in FIGS. 17A and 17B, the character pattern line width is equal to an interval between the lattice points. When the character pattern is reduced into a very small size so that its line width is smaller than the interval between the lattice points, the above problem conspicuously occurs.

A method of maintaining continuity of the black area, which is applied to the projection section 14 in FIG. 3, will be described with reference to FIGS. 18A, 18B, and 20. FIG. 18A shows part of the same diagonal drawing as that in FIG. 17A (a black portion between the two boundary segments 31 and 31''). This line drawing (of the boundary line 31) is traced from a position indicated by reference symbol D in the lower left direction. In the case shown in FIG. 18A, an angle defined by the line 31 at a position near a position D with respect to a line parallel to the y-axis (in this case, the direction of the line is not taken into consideration, but only the angular range of 0° to 90° is taken into consideration) is larger than an angle with respect to a line parallel to the x-axis. In this case, an intersection F between a lattice point G closest to the point F and a line (lattice line) passing through the next lattice point and parallel to the x-axis is computed. The area is so expanded as to include the point G in the black area (i.e., an area in which the W number is 1).

A technique for plotting points on the lattice points while maintaining 8-point connecting relationship of a line by a known linear drawing algorithm called a DDA (Digital Differential Analyzer) technique, and in particular, a Bresenham algorithm is used to obtain a point included in the expanded area. According to the DDA plotting technique, lattice points (plot targets) for approximating the line 31 as indicated by an arrow "→" and symbol "●" in place of an intersection between the line 31 and the lattice point line parallel to the x-axis are sequentially obtained in the case of FIG. 18A while the 8-point connecting relationship is kept maintained. In the same manner as in the case wherein the resultant points are initially included in the back area, the resultant points are set to belong to the black area even if they are present outside the black area. That is, the black area is expanded, as indicated by dotted curves. The above operations are similarly performed for the line 31' (provided that the tracking direction is an upper right direction), and the plotting target lattice points for approximating the line 31' are sequentially obtained while the 8-point connecting relationship is kept maintained. Lattice points of the boundary line 31 included in the expanded area are represented by triangular marks (△), and lattice points of the boundary line 31' included in the expanded area are represented by crossing marks (X). When dots corresponding to the points represented by the symbols "●" and "▲" are output as black dots, a pattern is obtained such that dots represented by crossing marks in FIG. 18B are excluded, and the black area is constituted by eight continuous dots, i.e., the 8-point connecting relationship. The result shown in FIG. 18B includes dots (crossing marks in FIGS. 18B) included in the expanded area upon processing of the boundary line 31'. In this case, the four adjacent black dots satisfy a 4-point connecting relationship but do not always satisfy this relationship. Even if the line width is reduced, the 8-point connecting relationship of the adjacent black dots can be assured by the known DDA plotting technique.

Figure 20:
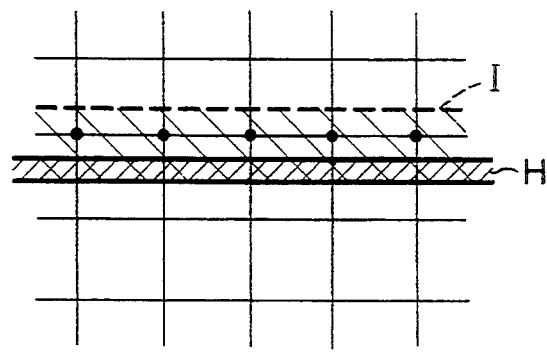
FIG. 20 is a view for explaining an operation when the DDA plot scheme is applied to a reduced horizontal pattern having a thin line.

When a kanji pattern (especially a character pattern of a Ming type) having a small horizontal line width is largely reduced, a black area H representing a horizontal line may fall within a space between the adjacent lattice lines, as shown in FIG. 20. In this case, when data WN of each lattice point is mathematically computed and the dot corresponding to the computed data WN is output, the horizontal line perfectly disappears. The DDA plotting technique is, however, applied to the above case, the black area (i.e., the area in which data WN is 1) is expanded to a position indicated by reference symbol I and including lattice points represented by black dots (●)FIG. 20 in line drawing for expressing, e.g., an upper boundary of the black area H. Therefore, the thin line in the character pattern will not disappear.

Figure 8:
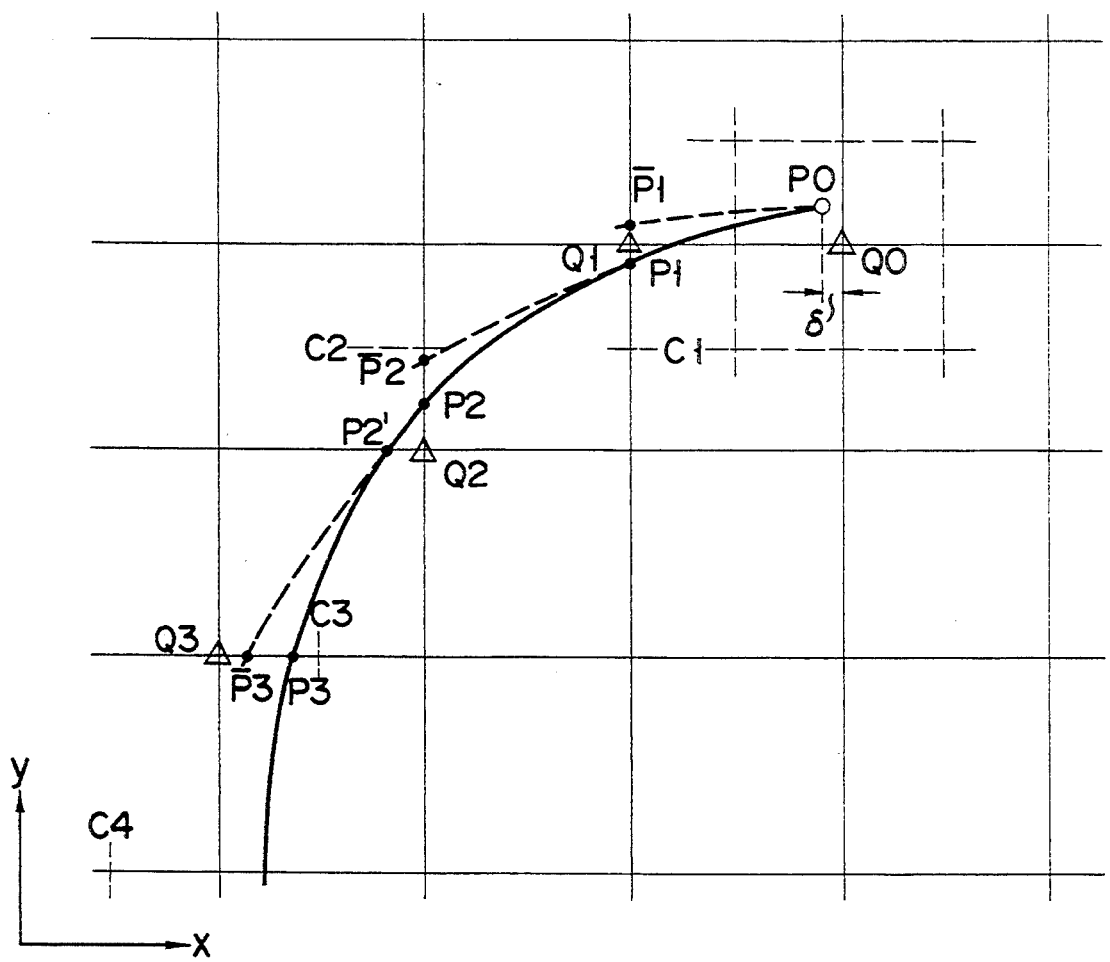
FIG. 8 is a view showing a detailed relationship between a segment which does not require the parameter expression and plot points.

The projection section 14 performs unique correction processing of a start point to obtain a tangential vector for a target vector at a point $P_i(P_0)$ for i=0 in Step S2. This correction processing is required due to the following reason. A coordinate value of the start point $P_0$ in the trace main axis (i.e., the x- or y-axis which allows the advance of tracing by one point while the 8-point connecting relationship is kept maintained) is not necessarily an integer. This coordinate point is shifted by $\delta$ from the coordinate value of the lattice point $Q_0$ closest to the point $P_0$ in the trace direction, as shown in FIG. 8. More specifically, a difference between the coordinate value (x-coordinate value) of the start point $P_0$ in the trace direction and a coordinate value of a point $\overline{P}_1$ (FIG. 8) is not just 1 but $(1-\delta)$. In this case, the point $\overline{P}_1$ is defined as a point at which a vector obtained by shifting a tangential vector at the start point $P_0$ by 1 along the trace main axis with respect the point $Q_0$ crosses a lattice line parallel to a trace subordinate axis (i.e., an axis perpendicular to the trace main axis). In order to obtain a coordinate value (y-coordinate value in this case) of the point $P_1$ in the trace subordinate axis in step S6, $(1-\delta)$ is used unlike in computation of points from a point $P_2$. Assume that the trace main axis is the x-axis, that the x- and y-coordinate values of the point $P_i$ are defined as $x_i$ and $y_i$, and that an absolute value of a gradient of a tangential vector at the point $P_i$ is defined as $y'(x_i)$. The y-coordinate value $\overline{y}_{i+1}$ of the point $\overline{P}_{i+1}$ is given as follows:

If i=0, then $$\overline{y}_{i+1} = y_i \pm y'(x_i)(1-\delta) \qquad (1)$$

If i≧1, then $$\overline{y}_{i+1} = y_i \pm y'(x_i) \qquad (2)$$

Symbol "±" in equations (1) and (2) represents that "+" or "−" depends on the direction of the tangential vector. In an increment direction of the y component in equations (1) and (2) is a "+" direction, and a decrement direction thereof is a "−" direction. The projection section 14 calculates $(1-\delta)$ in correction processing in step S2. To the contrary, if the trace main axis is the y-axis, the coordinate value $\overline{x}_{i+1}$ of the point $\overline{P}_{i+1}$ is defined as follows:

If i=0, then $$\overline{x}_{i+1} = x_i + \{(1/y'(x_i)\} \cdot (1-\delta) \qquad (3)$$

If i≧1, then $$\overline{x}_{i+1} = x_i + 1 \cdot y'(x_i) \qquad (4)$$

Note that the point $\overline{P}_{i+1}$ is a point obtained such that the point $P_{i+1}$ on the same target segment is approximated by the coordinate value in the trace main axis.

When the projection section 14 completes step S2 or step S10 (for incrementing i by one), the projection section 14 checks in step S4 whether a point $Q_i$ coincides with a point $Q_e$. If NO in step S4, a tangential vector at the point $P_i$ is obtained in step S4. When the projection section 14 calculates the tangential vector, the flow advances to step S6 through step S5 (to be described later). An x-coordinate value $x_i$ or a y-coordinate value $y_i$ (an x-coordinate value $x_{qi}$ or a y-coordinate value $y_{qi}$ for i=0) of the point $P_i$ along x- or y-axis which forms an angle having a smaller absolute value with respect to the tangential vector at the point $P_i$, i.e., along the trace main axis is incremented or decremented by one to obtain a coordinate value (an x-coordinate value $x_{i+1}$ or a y-coordinate value $y_{i+1}$) of the point $\overline{P}_{i+1}$ in the trace main axis (i.e., the first operation or an increment operation), and a coordinate value (a y-coordinate value $y_{i+1}$ or an x-coordinate value $x_{i+1}$) of the point $\overline{P}_{i+1}$ along the trace subordinate axis (i.e., the second operation) is obtained by using equations (1) to (4). The coordinate value of the point $P_{i+1}$ obtained in the first operation along the trace main axis coincides with that of the plot point $Q_{i+1}$ along the trace main direction.

Figure 9:
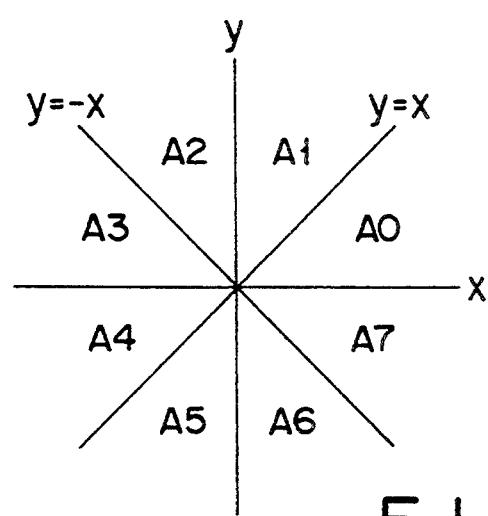
FIG. 9 is a view for explaining classification of directions of tangential vector.

The first operation (increment operation) is performed in accordance with one of eight areas A0 to A7 to which a direction of a tangential vector belongs. In this case, the eight areas A0 to A7 are divided by the x-axis, the y-axis, a line represented by y=x, and a line represented by y=−x using the point $P_i$ as an origin, as shown in FIG. 9. The contents of the first operation (increment operation) are shown in FIG. 10 (left side) in correspondence with the areas A0 to A7. As is apparent from the correspondence shown in FIG. 10, when the direction of the tangential vector belongs to any one of the areas A0, A3, A4, and A7, the trace main axis becomes the x-axis. However, when the direction of the tangential vector belongs to any one of the areas A1, A2, A5, and A6, the trace main axis becomes the y-axis. If i=0, the x- or y-coordinate value $x_{qi}$ or $y_{qi}$ is used as the x- or y-coordinate value $x_i$ or $y_i$ of the point $P_i$. The areas A0 to A7 correspond to eight moving directions (i.e., directions normalized in units of 45°) for maintaining the 8-point connecting relationship in the DDA plotting technique.

When the step S6 is completed by the projection section 14, the flow advances to step S7. The projection section 14 calculates a coordinate value ($x_{q(i+1)}$ or $y_{q(i+1)}$) of the next plot point $Q_{i+1}$ by using the coordinate value ($\overline{x}_{i+1}$ or $\overline{y}_{i+1}$) of the point $\overline{P}_{i+1}$ along the trace subordinate axis obtained in step S6 and a coordinate value ($x_q$ or $y_q$) of the present plot point $Q_i$ along the trace subordinate axis in accordance with the position determination condition (right side) shown in FIG. 10. The position determination condition determines to set that the coordinate value of the next plot point $Q_{i+1}$ in the trace subordinate axis is equal to the value of the coordinate value of the present plot point $Q_i$ in the trace subordinate axis or is different therefrom by one (i.e., a value incremented or decremented by one). This determination condition is prepared in units of the areas A0 to A7 (FIG. 9), as shown in FIG. 10. The coordinate value of the point $\overline{P}_{i+1}$ in the trace subordinate axis is determined whether to be close to the coordinate value of the point $Q_i$ in the trace subordinate axis or a coordinate value obtained by shifting this coordinate value by one in the direction of the tangential vector. A closer coordinate value is obtained as the coordinate value of the point $Q_{i+1}$ in the trace subordinate axis. A position serving as a reference in this position determination is shown as $C_i$ (i=1, 2, ...) in FIG. 8. Note that the coordinate value of the point $\overline{P}_{i+1}$ in the trace main axis which is obtained in step S6 is used as the coordinate value of the point $Q_{i+1}$ in the trace main axis.

When the projection section 14 obtains an x- and y-coordinate values $x_{q(i+1)}$ and $y_{q(i+1)}$ of the next plot point $Q_{i+1}$ in step S7, the projection section 14 obtains a direction code (moving direction code) representing segment directions (i.e., directions normalized in units of 45°) before and after the point $Q_i$ in accordance with the mutual position relations between the immediately previous plot point $Q_{i-1}$ and the present plot point $Q_i$ and between the point $Q_i$ and the point $Q_{i+1}$ in step S8. The mutual position relations described above are determined by the presence/absence of increment and the increment directions in the x- and y-axes, as is apparent from the directions of arrows in FIG. 5. If any increment is detected in step S7, the mutual position relation is easily determined with reference to, e.g., a table in accordance with the increment direction (i.e., a positive or negative direction in the trace subordinate axis). A point on another adjacent segment serves as $Q_{i-1}$ or $Q_{i+1}$ for the plot point $Q_i$ ($Q_0$ or $Q_e$) corresponding to the start or end point.

When the projection section 14 completes the operation in step S8, the flow advances to step S9. The projection section 14 refers to a WN code generation table 15 (FIG. 5) by using the two direction codes obtained in step S8, i.e., the code representing a moving direction of a segment portion approximated by the immediately preceding plot point of the point $Q_i$ and a code (succeeding moving direction code) representing a moving direction of an immediately succeeding segment portion of the point $Q_i$. The projection section 14 then generates a WN code determined by a combination of the moving directions of the immediately preceding and succeeding segment portions of the present plot point $Q_i$ since these segment portions are represented by the two direction codes.

When processing in step S9 is performed, the content of the WN code storage area in the WNPM 17 represents WN codes of the respective plot points up to the plot point $Q_i$ corresponding to the point $P_i$ on the in-processing segment. Subsequently, the projection section 14 increments i by one in step S10, and the flow returns to step S3. The projection section 14 determines in step S3 whether the point serving as the present plot point $Q_i$, i.e., the point computed as the point $Q_{i+1}$ in step S7 is the point $Q_e$. If NO in step S3, the operations from step S4 are repeated.

A plot point $Q_2$ corresponding to the next point $P_2$ is computed after the plot point $Q_1$ corresponding to the point $P_1$ on the segment shown in FIG. 8 is computed. In order to obtain a plot point $Q_3$ corresponding to the next point $P_3$, assume that a tangential vector at the point $P_2$ (i=2) is obtained in step S4. The direction of this tangential vector belongs to the area A5 shown in FIG. 9, and the trace main axis is the y-axis. The direction of the tangential vector of the point $P_1$ preceding the point $P_2$ belongs to the area A4 shown in FIG. 9, and the trace main axis is the x-axis. That is, at point $P_2$, switching (updating) of the trace main axis occurs. In this case, a distance from the point P₂ to the next point P₃ is not one, but exceeds one in the case shown in FIG. 8. This switching of the trace main axis occurs when the direction of the tangential vector at the point $P_i$ is changed to exceed the straight line represented by y=x or y=−x with respect to the direction of the tangential vector at the previous or immediately preceding point $P_{i-1}$.

In this embodiment, unique correction processing is performed in step S5 when the trace main axis is changed. For example, in the case of FIG. 9, a tangential vector up to a point P₂, (i.e., a target segment point having the same coordinate value of the present plot point Q₂ in the trace subordinate axis after switching) is obtained. This tangential vector is used in place of the tangential vector computed in step S4. A coordinate value at a point $\overline{P}_3$ ($\overline{P}_{i+1}$) is computed on the basis of the tangential vector at the point P₂, (P_r). The subsequent operations are the same as those described above. The operation in step S5 for recomputing the tangential vector at the point P₂, is performed to reduce an error caused by low resolutions frequently obtained in character pattern generation.

Figure 7A:
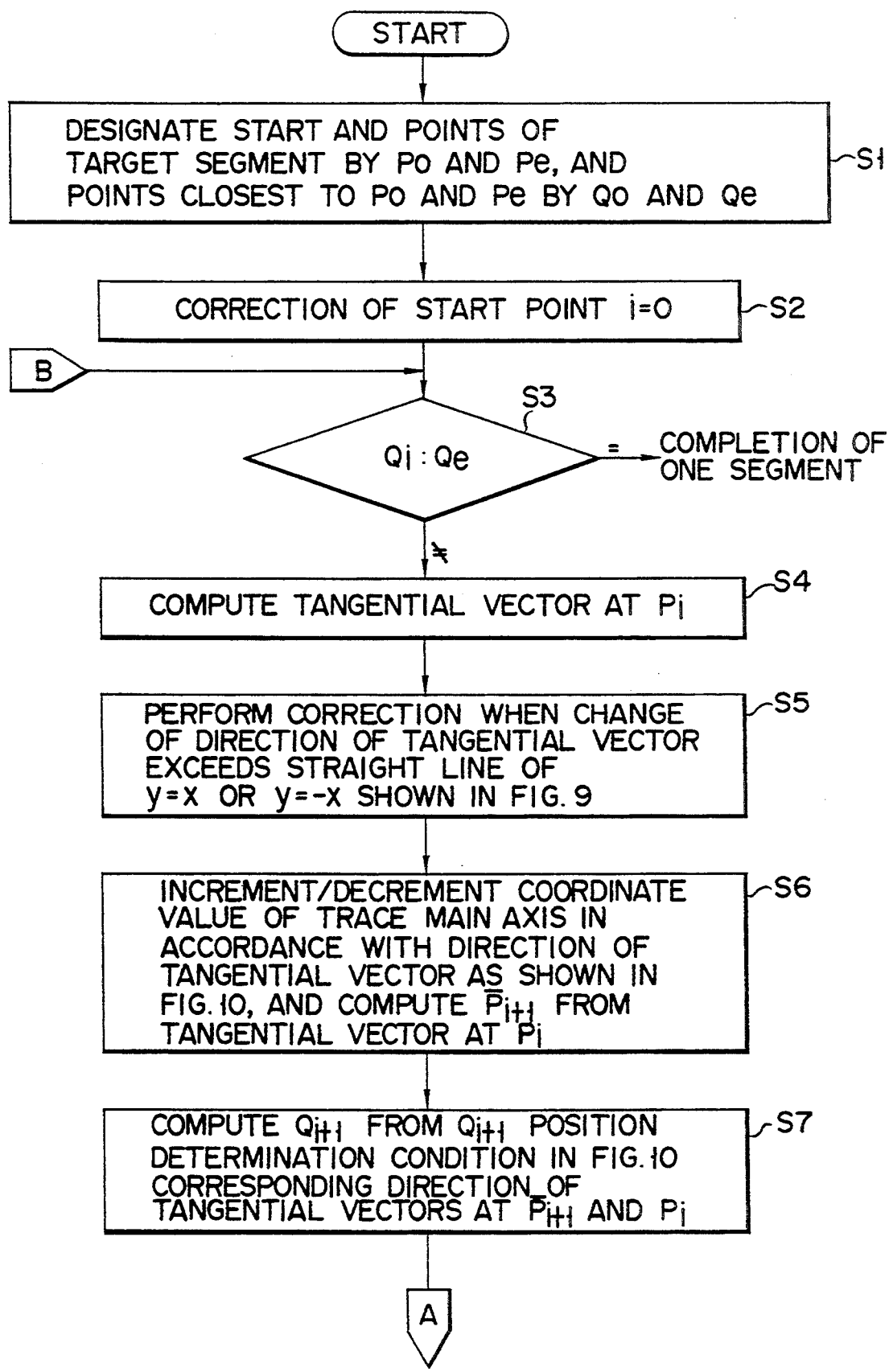
FIGS. 7A and 7B are flow charts for explaining operations of a projection section 14 shown in FIG. 3 when segments which do not require parameter expressions are processed.
Figure 7B:
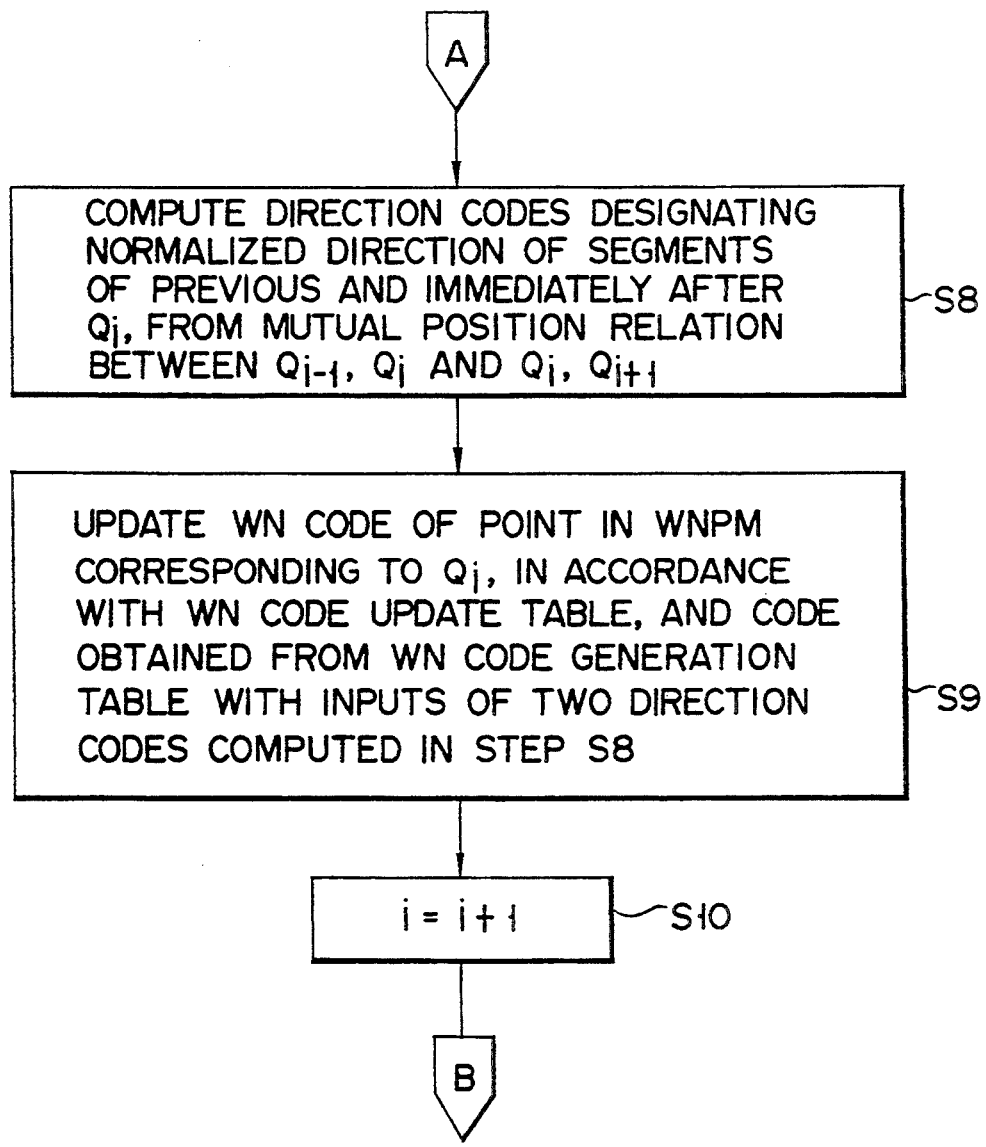

All the plot points Q₀ to $Q_e$ corresponding to all the points from the start point P₀ to the end point $P_e$ on the target segment are obtained, and the WN codes of the respective points in the WNPM 17 which respectively correspond to the points Q₀ to $Q_e$ are updated. In this state, condition $Q_i = Q_e$ is determined in step S3, and processing for one segment shown in the flow charts of FIGS. 7A and 7B is completed. The processing shown in FIGS. 7A and 7B is performed for all segments constituting each line drawing (closed curve) and is repeated in units of segments. When processing for all the segments constituting one character pattern is completed, the same processing as described above is repeated for the next character pattern.

Figure 11A:
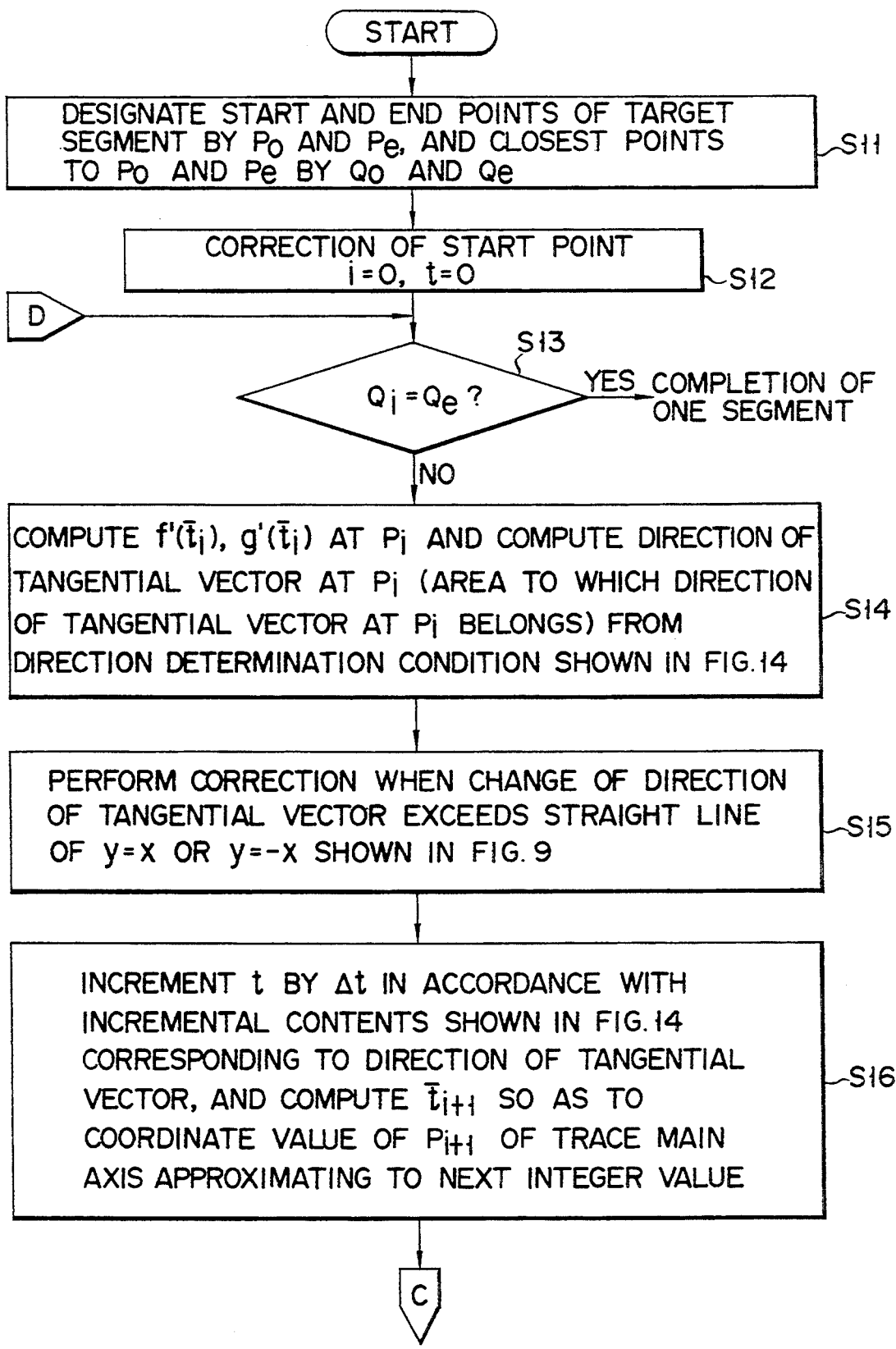
FIGS. 11A and 11B are flow charts for explaining operation of the WNG 14 when the segments which require the parameter expressions are processed.
Figure 11B:
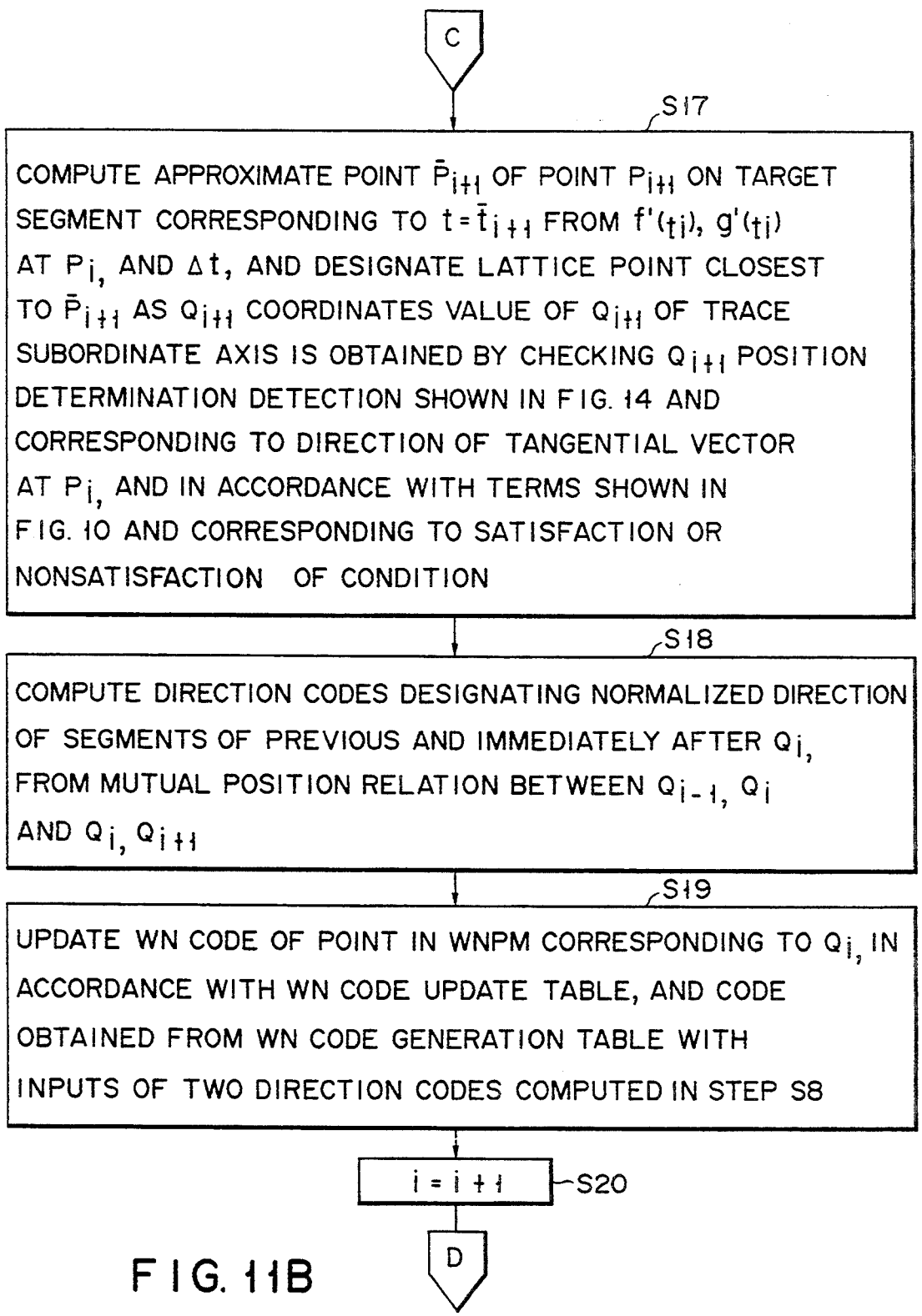

In the above description, a line segment or curve whose each segment can be expressed by two variables as $\underline{x}$ and $\underline{y}$ is processed. In order to process a segment (curved segment) generally expressed by the following equations:

$$x = f(t)$$
$$= ax t^3 + bx t^2 + cx t + dx$$
$$y = g(t)$$
$$= ay t^3 + by t^2 + cy t + dy$$

when the curve is expressed by a parameter, i.e., t as a parameter, flow charts shown in FIGS. 11A and 1B are used in place of the flow charts in FIGS. 7A and 7B. Plot points Q₀ to $Q_e$ respectively corresponding to a start point P₀ to an end point $P_e$ are obtained, and WN codes of the respective points in the WNPM 17 which correspond to the points Q₀ to $Q_e$ can be updated. This operation will be described with reference to FIGS. 11A, 11B, 12, 13A, 13B, and 14.

Figure 12:
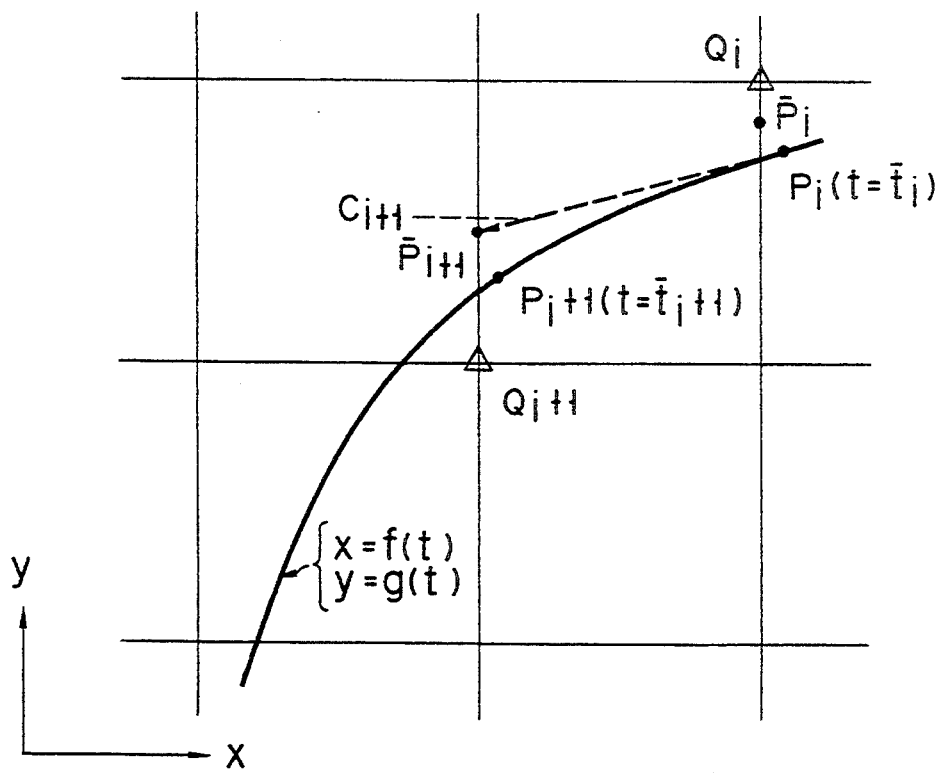
FIG. 12 is a view showing a detailed relationship between the segment which requires the parameter expression and the plot points.
Figure 13A:
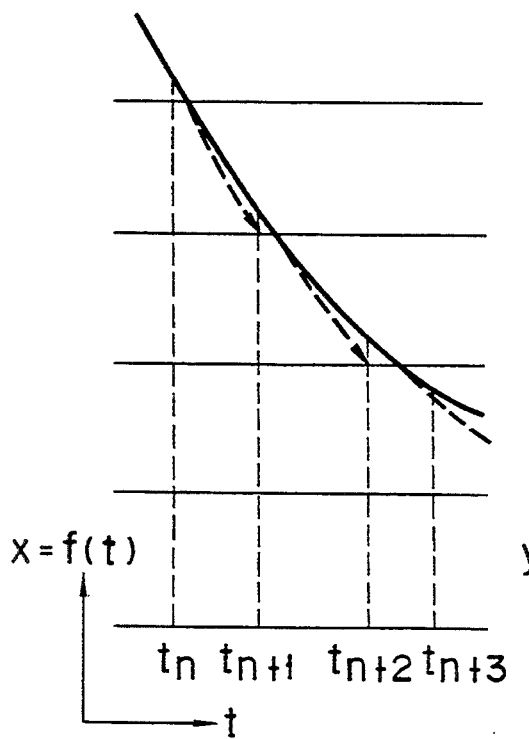
FIGS. 13A and 13B are views for explaining the operations for determining an increment of a parameter for the segment.
Figure 13B:
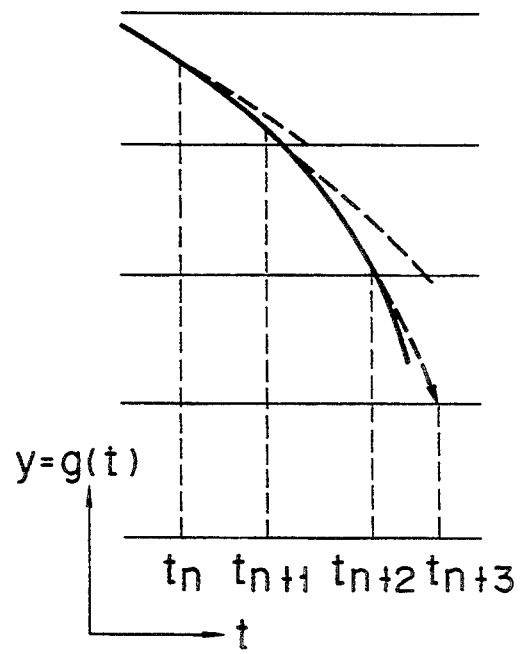

The projection section 14 designates start and end points of a curved segment by P₀ and $P_e$ and closest points to P₀ and $P_e$ by Q₀ and $Q_e$. The same operation as in step S1 of the flow chart in FIG. 7A is performed (step S11). Functions f(t) and g(t) which represent the curved segment in FIG. 12 are shown in FIGS. 13A and 13B, respectively.

When the projection section 14 completes the operation in step S11, it sets i=0 and t=($\bar{t}_i = \bar{t}_0 = 0$), and correction processing required for the start point is performed to obtain a tangential vector at a point $P_i$ ($P_0$) due to the same reason as in step S2 of FIG. 7A (step S12). When the projection section 14 determines in step S13 that $Q_i \neq Q_e$, it computes differential values $f'(\bar{t}_i)$ and $g'(\bar{t}_i)$ of the functions $f(\bar{t}_i)$ and $g(\bar{t}_i)$ of the parameter t (t=$t_i$) at the point $P_i$ and determines one of the areas A0 to A7 (FIG. 9) to which a direction of the tangential vector belongs on the basis of the computed values $f'(\bar{t}_i)$ and $g'(\bar{t}_i)$ and the tangential direction determination condition (FIG. 14). If the direction of the tangential vector at the point $P_i$ which is determined in step S14 exceeds the straight line represented by y=x or y=−x in FIG. 12, the projection section 14 performs the same correction processing as in step S5 of FIG. 7A (step S15). Since an increment Δt required for determining the point $P_i$ is approximated as follows even if i represents a value except for 0. As shown in FIG. 12, unlike in the case of FIG. 8, the point $P_i$ is not always plotted on the trace subordinate axis. However, the point $\overline{P}_i$ in FIG. 12 is plotted on the trace subordinate axis for approximating the point $P_i$ in the same manner as in FIG. 8.

The projection section 14 advances to step S16 through steps S14 and S15. In step S16, a value (i.e., the coordinate value of the point $P_{i+1}$ is close to the next integer of the present plot point $Q_i$) required to increment (or decrement) the coordinate value of the trace main axis, i.e., the x- or y-axis from the point $\overline{P}_i$ to $\overline{P}_{i+1}$ in correspondence with a larger one of absolute values $|f'(\bar{t}_i)|$ and $|g'(\bar{t}_i)|$ (the absolute value $|f'(t_n)|$ is larger in tn and the absolute value $|g'(t_n)|$ is larger in $t_{n+2}$ in the case of FIGS. 13A and 13B) is obtained in accordance with the increment operation content (FIG. 14) corresponding to the direction of the tangential vector. In this case, as is apparent from FIG. 14, when the direction of the tangential vector at the point $P_i$(t=$\bar{t}_i$) is defined such that when the trace main axis is the x-axis, $f(\bar{t}_i)$, $f(\bar{t}_i)$, and the x-coordinate value $x_{qi}$ of the present plot point $Q_i$ are used to calculate Δt. However, when the trace main axis is the y-axis, the $g(\bar{t}_i)$, $g'(\bar{t}_i)$, and the y-coordinate $x_{qi}$ of the present plot point $Q_i$ are used to obtain Δt. In addition, the projection section 14 moves $t_i$ corresponding to the point $P_i$ by Δt to obtain the t value $\bar{t}_{i+1}$ corresponding to the next point $P_{i+1}$.

When the WNG 14 completes the operation in step S16, it advances to step S17. The coordinate of the approximated point $\overline{P}_{i+1}$ of the point $P_{i+1}$ on the target segment corresponding to t=$\bar{t}_{i+1}$ obtained in step S16 is computed by the coordinate value of the point $P_i$ in the trace coordinate axis, the $f'(t_i)$ or $g'(t_i)$ at the point $P_i$, and the value Δt. More specifically, when the trace subordinate axis is the y-axis, the projection section 14 adds or subtracts $g'(\bar{t}_i)\cdot\Delta t$ to or from the coordinate value yi of the point $P_i$ to obtain a y-coordinate value $\overline{y}_{i+1}$ of the point $\overline{P}_{i+1}$. However, when the trace subordinate axis is the x-axis, the projection section 14 adds or subtracts $f'(\bar{t}_i)\cdot\Delta t$ to or from the x-coordinate value $x_i$ of the point $P_i$ to obtain an x-coordinate value $\overline{x}_{i+1}$ of the point $\overline{P}_{i+1}$. The coordinate of the point $\overline{P}_{i+1}$ in the trace main axis is apparently a value obtained by incrementing the coordinate value of the point $\overline{P}_{i(Qi)}$ in the trace main direction by one in the direction of the trace main axis component. When the projection section 14 computes the x- and y-coordinate values $\overline{x}_{i+1}$ and $\overline{y}_{i+1}$, it defines the lattice point nearest to the point $\overline{P}_{i+1}$ as the next plot point $Q_{i+1}$. A coordinate value ($x_{q(i+1)}$ or $y_{q(i+1)}$) of the point $Q_{i+1}$ in the trace main axis coincides with the coordinate value ($x_{i+1}$ or $y_{i+1}$) of the point $P_{i+1}$ in the trace main axis. The coordinate value of the point $Q_{i+1}$ in the trace subordinate axis is computed as follows.

As shown in FIG. 14 in the same manner as in FIG. 10, position determination conditions corresponding to the areas A0 to A7 shown in FIG. 9 are prepared. A position determination condition corresponding to the area to which the direction of the tangential vector obtained in step S14 belongs is used. A coordinate value $y_{q(i+1)}$ or $x_{q(i+1)}$ as in FIG. 10 is computed in accordance with the YES or NO determination.

When the operation in step S17, the projection section 14 executes the operations in steps S18 and S19 as in steps S8 and S9 in FIG. 7B. The WN code on the point in the WNPM 17 which corresponds to the present plot point $Q_i$ is updated, and $i$ is incremented by one (step S20). The flow then returns to step S13.

In the processing for the curved segment for parameter representation, the value of $\Delta t$ is not set to be a fixed value. The x- or y-axis corresponding to the larger one of the absolute values $|f'(t_i)|$ or $|g'(t_i)|$ is used as the trace axis, and the coordinate value in the trace main axis is the value for incrementing or decrementing the point $P_i$ to $P_{i+1}$. Therefore, even if linear interpolation for plotting is to be performed or fine characters are to be printed at, e.g., a laser beam printer, there is not fear of recomputations of the same plot points which are caused by an excessively small value $\Delta t$.

Figure 15:
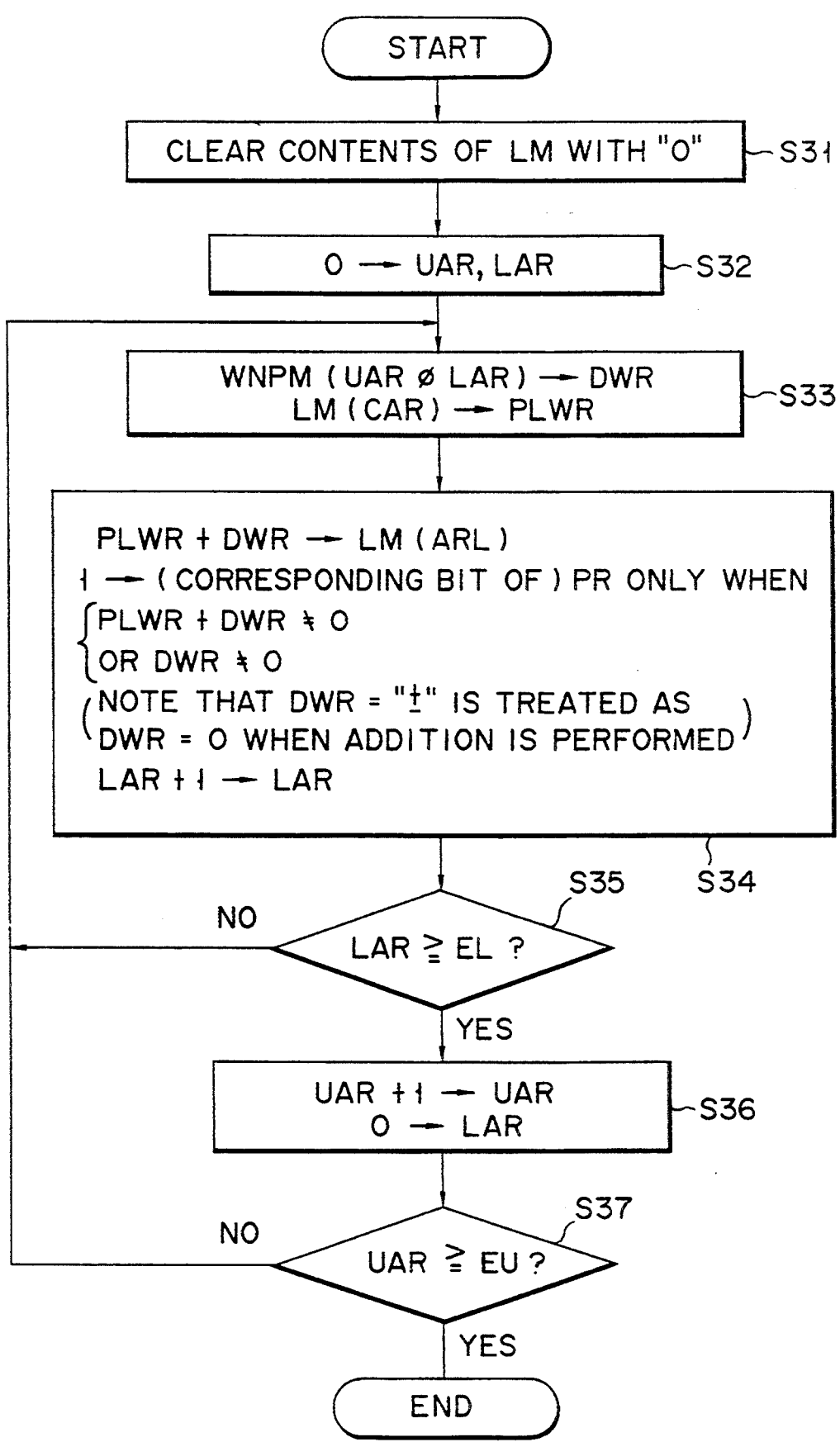
FIG. 15 is a flow chart for explaining an operation of the filling processing section.

An operation of the filling processing section 18 will be described with reference to a flow chart in FIG. 15. The filling processing section 18 performs filling by using WN codes stored in the memory 17-2 (of the two WN code memories in the WNPM 17) designated by a memory selection command. The WN codes of the connected points in the scanning line direction are sequentially read out, and filling processing is performed in units of eight points. Processing in units of eight points is determined in accordance with an arrangement of the bit map memory 20 in which word addresses are continuously assigned to the scanning line direction.

The filling processing section 18 clears the content of the LM 19 to zero in step S11. In step S12, zero is selected by the selectors 45 and 46 under the control of the controller 52 and is loaded in the UAR 41 and the LAR 42. The upper address latched by the UAR 41 and the lower address latched by the LAR 42 are output to the WNPM 17 together with a memory designation bit from the controller 52 in step S13. The WN codes (24 bits) of eight points (target word) connected in the scanning line direction of the memory 17-1, e.g., in the horizontal direction, and the readout codes are latched by the DWR 47. The content of the LAR 42 is also used to designate a word position (word column position) of the LM 19. Reference line WN data (16 bits) corresponding to the target word of the LM 19 which is designated by the lower address is read out and latched in the PLWR 48. Symbol $\phi$ of "UAR$\phi$LAR" in step S13 of FIG. 15 indicates concatenation between the upper and lower addresses latched by the UAR 41 and the LAR 42.

The reference line WN data corresponding to the WN code of the target word latched by the DWR 47 and the PLWR 48 is supplied to the dot generation circuit 49. In step S14, the circuit 49 simultaneously adds WN codes and the reference line WN data of the eight points, as indicated by the "DWR+PLWR" in step S14. The WN code of each point latched by the DWR 47 is one of the codes "−3" to "+3", and "±". However, the WN code "±" is dealt as "0" in the above additions. The sum represented by the "DWR+PLWR" represents the data WN of this point. The data WN of the eight points generated by the circuit 49 is output to the LM 19 through the bus driver 51 as new reference line WN data referred to when the corresponding point of the same column position of the next scanning line represented by the content "+1" of the UAR 41 is subjected to filling processing. The generated data WN is written at the initial word position of the LM 19 which is designated by the LAR 42. When the present invention is applied to a system capable of printing characters having a maximum size of 2" at a maximum resolution of 600 DPI (dots/inch), the number of dots of the character pattern in the horizontal direction is at least 1,200. The LM 19 which can provide this capacity can be realized by a commercially available high-speed static one-chip RAM. It is also possible to arrange the LM 19 together with the filling processing section 18 into an LSI.

The dot generation circuit 49 checks the sum represented by the "DWR+PLWR" and the WN code of each point latched in the DWR 47 and generates filling bit data for a point when at least one of the sum and the WN code of the point is not set to be "0". A point whose sum and the WN code are both zeros is output as filling bit data of "0" (white display). In this embodiment, of all the WN codes of the eight points latched by the DWR 17, a point corresponding to the WN code of "0" is generated as the filling bit data of logic "1" for black display even if a point corresponding to the WN code of logic "0" represents a code "±". Therefore, filling bit data of logic "1" is always generated for a dot position on which the edge line is projected, and even a thin pattern can be clearly expressed without any omissions when the reference WN data for a given point of a word preceding the target word is set to be "0" and the WN code of the corresponding point is "±", the filling bit data of logic "1" is generated even for the data WN of "0". Therefore, a thin pattern reduced to a size smaller than one dot interval can be expressed without omitting the black line.

The filling data of the eight points output from the dot generation circuit 49 is transferred to the bit map memory 20 through the PR 50. At this time, the ready signal RDY representing a data write enable state is output from the controller 52 in the filling processing section 18 to the BITBLT circuit 21. Set-up data required for continuously writing the filling data in the bit map memory 20 is set in the BITBLT circuit 21 at the start time of filling processing. The set-up data includes coordinates of a write start position P of the partial pattern in the bit map memory 20, x- and y-direction pitches (EL and EU bits) of the partial pattern, and the like.

Figure 16:
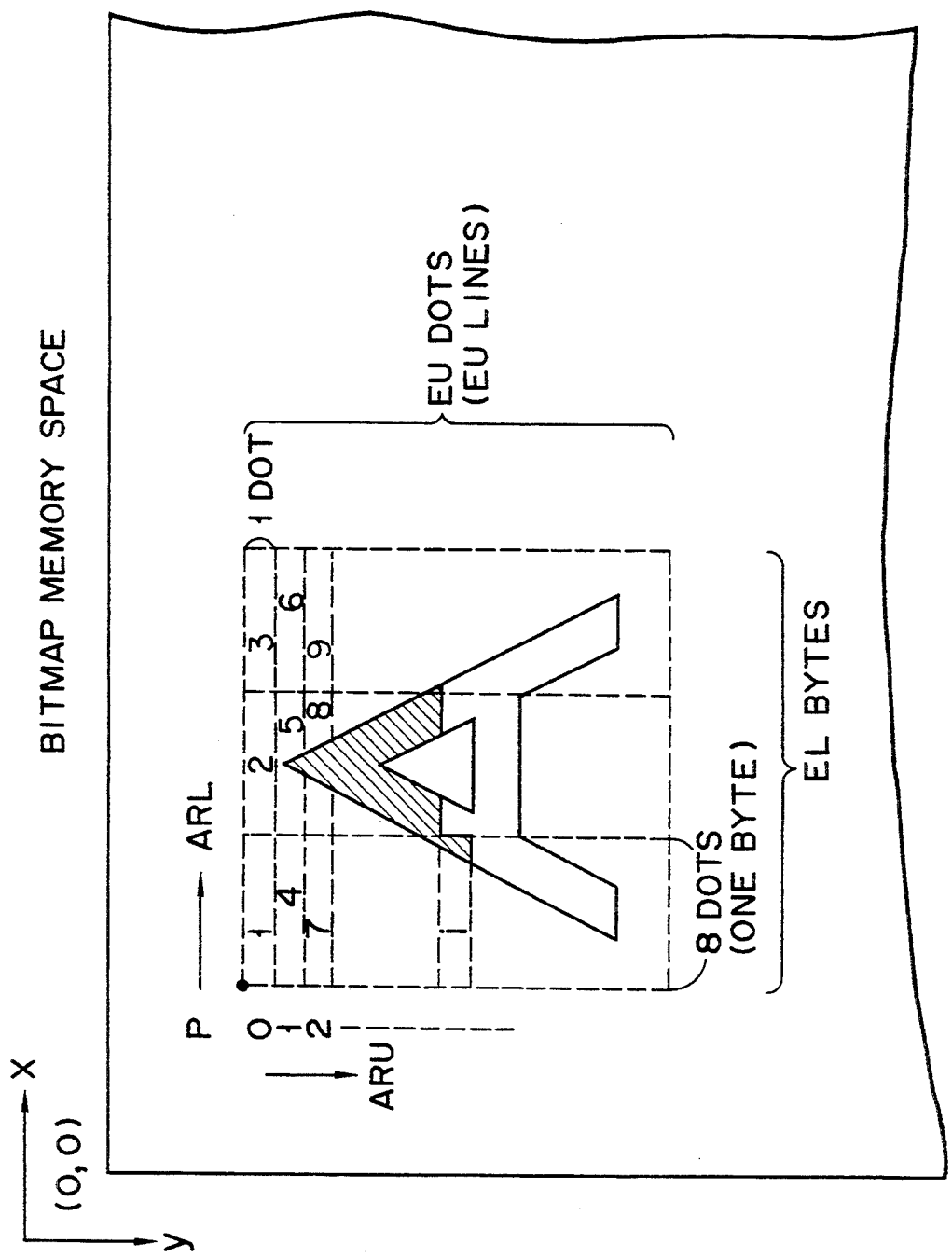
FIG. 16 is a view for explaining the sequence of the filling processing section 18 in correspondence with the memory space of a bit map memory 20 shown in FIG. 3.

The BITBLT circuit 21 sequentially writes column addresses in the 1, 2, and 3 scanning line directions while incrementing the column data one by one in response to the signal RDY, as shown in FIG. 16. When write access of the EL byte portion is completed, the row address is incremented by one, and the column address is returned to the same value as that of address 1, thereby writing the filling data.

In step S14, the content of the LAR 42 is incremented by one by the +1 circuit 44. In step S15, the lower address represented by the LAR 42 is compared with the byte count EL of the memory 17-1 in the scanning line direction by the LAR 42. If the value stored in the LAR 42 is equal to or larger than the value EL, an operation in step S16 is performed. In step S16, the content of the UAR 41 is incremented by one by the +1 circuit 43, and the incremented value is set in the LAR 42 in place of zero. In step S17, the upper address represented by the UAR 41 is compared with the filling direction line count EU of the memory 17-1. When the value stored in the UAR 41 is smaller than the value EU, the flow returns to step S13 again. However, when the value stored in the UAR 41 is equal to or larger than the value EU, filling processing for one pattern is completed.

In the above filling processing, the set-up data required in filling of one partial pattern can be set in the BITBLT circuit 21 once, and high-speed transfer of data to the bit map memory 20 by using the BITBLT circuit 21 can be achieved. In a system in which filling data is simply written in the filling direction (i.e, EU direction), however, new set-up data must be set every time the filling data having a one-word width is written in the EU direction. When the EL value is large (although EL=3 bytes is set in FIG. 6 for illustrative convenience, 150 or more are required when the present invention is applied to a system capable of printing a character having a maximum size of 2" at a maximum resolution of 600 DPI), it is very difficult to perform high-speed transfer.

Figure 22A:

An operation for generating a pattern obtained by reducing a pattern shown in FIG. 21 to ⅓ in filling processing by the filling processing section 18 will be described below. In this case, first, WN codes for an upper edge line are generated. States of the WN codes of the respective points are represented by "+" in FIG. 22A. WN codes for the lower edge line are then generated. When updating of the WN codes is required, the upper and lower edge lines overlap at identical dots as result of reduction, and the final states of the WN codes of the respective points of the pattern are shown in FIG. 22C. When the filling processing is performed on the basis of the WN codes shown in FIG. 21C, a line having a one-dot width (i.e., a portion Pa drawn with "±" in FIG. 22C) can be correctly generated.

In this embodiment, as shown in FIGS. 23 and 24, points which become black points and are selected from the upper and lower adjacent dots as in points $P_5$ and $P_6$ which are not written with the WN codes are not subjected to updating of the WN codes, as is apparent from the operation of the projection section 14. Unnecessary access of the WNPM 17 is not performed. In addition, in a pattern having a one-dot sharp end, its point P7 has the WN code "±" as shown in FIG. 24. Therefore, correct filling can be performed as in FIGS. 22A and 22B.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An apparatus for generating a high-quality pattern whose boundary is defined by edge lines, comprising:
   first determining means for determining line drawing information by sequentially processing lattice points one by one, the line drawing information defining a pattern for at least one line drawing, the lattice points approximating segments, and the segments constituting a line drawing having an 8-point connecting relationship;
   second determining means for determining a change in state of a winding number at a present plot-target-lattice point in a moving direction from a reference lattice point, the reference lattice point being determined by a mutual relation between a position of the present plot-target-lattice point and positions of the lattice points for approximating segments preceding and succeeding the present plot-target-lattice point;
   code generating means for generating one of a first value representing no change of the winding number, a second value representing an increment of the winding number, a third value representing a decrement of the winding number, and a fourth value representing simultaneous occurrence of the increment and the decrement of the winding number as a winding-number-change count or a first winding number code representing a change in state in an order of the line drawing represented by the line drawing information and in a direction tracing the line drawing;
   winding number code storage means for storing the winding-number-change count or a second winding number code representing a change in state of each point of all line drawings that define the pattern;
   updating means for updating the second winding number code of a given lattice point in said winding number code storage means based on the first winding number code generated by said code generating means, wherein a given lattice point corresponds to the first winding number code;
   extracting means for sequentially extracting second winding number codes of respective lattice points stored in said winding number code storage means in a filling direction; and
   generating means for generating winding numbers based on the extracted second winding number codes.

2. An apparatus according to claim 1, wherein said first determining means comprises means for computing a tangential vector or tangential vector components of the present plot-target-lattice point or segments near said present plot-target-lattice point, and for determining a next plot-target-lattice point based on the tangential vector or tangential vector components.

3. An apparatus according to claim 2, wherein said first determining means further comprises means for approximating coordinates of a point on the segment wherein the coordinates of the point are different by one from an x- or y-coordinate value of the present plot-target-lattice point, and means for obtaining an approximated point having the same x- or y-coordinate value as the point on the segment based on tangential vector information, and obtaining a next plot-target-lattice point serving as a next plot target based on the approximated point and a direction of the tangential vector.

4. An apparatus according to claim 3, wherein said first determining means further comprises means for obtaining a coordinate value of the approximated point on a trace main axis by incrementing or decrementing a coordinate value equal to the coordinate value of the present plot-target-lattice point on the trace main axis in accordance with the direction of the tangential vector, the trace main axis being an axis selected from the x- and y-axes and having a smaller absolute value of an angle formed with the tangential vector, and means for obtaining a coordinate value of the approximated point in a trace subordinate axis different from the trace main axis based on the tangential vector.

5. An apparatus according to claim 4, wherein said first determining means further comprises means for determining whether the same coordinate value as that of the present plot-target-lattice point in the trace subordinate axis is incremented by one, decremented by one, or used without any change based on the coordinate value of the approximated point on the trace subordinate axis and the direction of the tangential vector, means for obtaining a coordinate value of the next plot-target-lattice point of the trace subordinate axis which is equal to or different by one from the coordinate value of the present plot-target-lattice point in accordance with a determination result, and means for designating the coordinate value of the approximated point on the trace main axis as a coordinate value of the next plot-target-lattice point on the trace main axis.

6. An apparatus according to claim 2, wherein when the segment is a curved segment defined by functions $x=f(t)$ and $y=g(t)$ expressed by a parameter, said first determining means further comprises means for computing differential values $f'(t)$ and $g'(t)$ of the parameter at a point on the segment as the tangential vector components, for computing an increment $\Delta t$ required for incrementing or decrementing a coordinate value of a trace main axis having a larger absolute value of angles formed with the tangential vector by one with respect to a coordinate value of the present plot-target-lattice point on the trace main axis, determining whether a coordinate value of a next plot-target-lattice point in a trace subordinate axis is set to be a value incremented or decremented by one with respect to the present plot-target-lattice point based on a change amount of the coordinate value of the trace subordinate axis which is represented by a product of the increment $\Delta t$ and the differential value of the coordinate value of the trace coordinate axis, and obtaining the next plot-target-lattice point based on a determination result.

7. An apparatus according to claim 1, wherein said filling means comprises means for sequentially extracting the second winding number codes of the lattice points from said winding number code storage means in units of N points (N is an integer of not less than 2) in a line direction, generating the corresponding winding numbers of the N lattice points based on second winding number codes of the N points, and executing filling in units of N points by sequentially switching the line.

8. An apparatus according to claim 7, further comprising reference line data storage means for storing the winding numbers of the N lattice points which are generated by said filling means as reference line data which are referred to by said filling means in filling of a next line, and wherein said filling means comprises means for simultaneously generating N-point winding numbers and filling data based on N-point second winding number codes extracted from said winding number code storage means and the N-point reference line data stored in said reference line data storage means, and rewriting the N-point winding numbers in an initial position of said reference line data storage means.

9. An apparatus according to claim 1, wherein said updating means comprises means for adding one to the second winding number code when the first winding number code represents the second value, subtracting one from the second winding number code when the first winding number code represents the third value, employing a result when the result does not represent zero, employing the fourth value when the result represents zero, employing the fourth value when the first winding number code represents the fourth value and the second winding number code represents zero, and inhibiting to update the second winding number code when the first winding number code represents the fourth value and the second winding number code does not represent zero.

10. An apparatus according to claim 9, wherein said filling means comprises means for, when the second winding number code represents the fourth value, giving as zero to the addition between the N-point second winding number codes extracted from said winding number code storage means and the N-point reference line data stored in said reference line data storage means to generate the N-point winding numbers, and for generating filling data of the corresponding points in accordance with whether the generated winding numbers or the second winding number codes represent the first values.

11. An apparatus according to claim 10, wherein said winding number code storage means comprises at least two storage areas for storing the second winding number codes concerning one character pattern, said storage areas being cyclically switched to store the second winding number codes every time the line drawing is switched and being used for filling by said filling means after all the second winding number codes concerning said one character pattern are stored.

12. An apparatus for generating a high-quality pattern defined by edge lines, comprising:
code pattern memory means for storing winding number codes;
determining means for sequentially determining lattice points one by one as line drawing information, the line drawing information defining a pattern for at least one line drawing, the lattice points approximating corresponding segments which constitute the line drawing, and the line drawing having an 8-point connecting relationship, for determining a change in state of a winding number of a present plot-target-lattice point based on a moving direction of a reference lattice point, the reference lattice point being determined by a mutual position relation between the present plot-target-lattice point and lattice points for approximating the segments preceding and succeeding the present plot-target-lattice point, for determining winding number codes representing a change count of the winding numbers, for computing a tangential vector or tangential vector components of the present plot-target-lattice point or the segments preceding and succeeding the present plot-target-lattice point, for determining a next plot-target-lattice point, for projecting size-changed input edge lines for defining the pattern, in units of points, in said code pattern memory means while the winding number codes of the corresponding points stored in said code pattern memory means are updated by using the winding number codes determined in units of points, and for generating a projection end response when projection of the size-changed edge lines is completed;

filling means for filling an area defined by the size-changed edge lines in accordance with the winding number codes read out from said code pattern memory means to obtain a dot pattern in response to an input filling command; and control means for outputting a projection start command in response to an input pattern generation instruction and outputting the filling start command to said filling means in response to a projection and response from said determining means.

13. A method of generating a high-quality pattern for visual display defined by edge lines, comprising the computer steps of:

(a) computing winding number codes representing differences in winding number data between dots projected along an edge line, the dots being a present plot-target-lattice point, and points adjacent to the present plot-target-lattice point in a filling direction and a direction opposite to the filling direction;

(b) obtaining a tangential vector or tangential vector components of the present plot-target-lattice point or segments adjacent thereto;

(c) determining a next plot-target-lattice point based on tangential vector information;

(d) obtaining filling data of a target point from the present plot-target-lattice point with reference to the winding number data of the adjacent point in the direction opposite to the filing direction; and (e) filling the present plot-target-lattice point in accordance with the winding number data of the target point.

14. A method according to claim 13, wherein the step (c) comprises the steps of:

(f) approximating a point on the segment which is different from an x- or y-coordinate value of the present plot-target-lattice point by one;

(g) obtaining the tangential vector information of an approximated point having the same x- or y-coordinate value as that on the segment; and (h) obtaining a next plot-target-lattice point serving as a next plot target based on the approximated point and a direction of the tangential vector.

* * * * *

UNITED STATES PATENT AND TRADEMARK OFFICE
CERTIFICATE OF CORRECTION

PATENT NO. : 5,428,719
DATED : June 27, 1995
INVENTOR(S) : Fumitaka SATO

It is certified that error appears in the above-indentified patent and that said Letters Patent is hereby corrected as shown below:

Claim 13, Column 24, Line 9, change "filing" to --filling--.

Signed and Sealed this

Twentieth Day of February, 1996

Attest:

BRUCE LEHMAN

*Attesting Officer*  *Commissioner of Patents and Trademarks*